(12) United States Patent
Inoue et al.

(10) Patent No.: US 8,285,448 B2
(45) Date of Patent: Oct. 9, 2012

(54) SUSPENSION SYSTEM FOR VEHICLE

(75) Inventors: Hirofumi Inoue, Toyota (JP); Hideshi Watanabe, Kasugai (JP); Takuhiro Kondo, Kani (JP)

(73) Assignees: Toyota Jidosha Kabushiki Kaisha, Toyota-shi (JP); Kayaba Industry Co., Ltd., Tokyo (JP)

( * ) Notice: Subject to any disclaimer, the term of this patent is extended or adjusted under 35 U.S.C. 154(b) by 618 days.

(21) Appl. No.: 12/440,183

(22) PCT Filed: Aug. 28, 2007

(86) PCT No.: PCT/JP2007/066651
§ 371 (c)(1),
(2), (4) Date: Mar. 5, 2009

(87) PCT Pub. No.: WO2008/032562
PCT Pub. Date: Mar. 20, 2008

(65) Prior Publication Data
US 2010/0025946 A1   Feb. 4, 2010

(30) Foreign Application Priority Data

Sep. 12, 2006   (JP) .................................. 2006-246644

(51) Int. Cl.
| | |
|---|---|
| B60G 17/018 | (2006.01) |
| B60G 23/00 | (2006.01) |
| B60G 17/0185 | (2006.01) |
| B60G 17/04 | (2006.01) |
| B60G 17/015 | (2006.01) |
| B60G 17/052 | (2006.01) |
| B60G 17/02 | (2006.01) |
| B60G 17/00 | (2006.01) |
| B62C 3/00 | (2006.01) |
| B62K 25/00 | (2006.01) |
| G06F 7/00 | (2006.01) |
| G06F 17/00 | (2006.01) |
| G06F 19/00 | (2011.01) |
| B60P 1/00 | (2006.01) |
| B60S 9/00 | (2006.01) |

(52) U.S. Cl. ...... 701/37; 701/39; 280/5.514; 280/5.515; 280/6.157

(58) Field of Classification Search .................... 701/37, 701/39; 280/5.506, 5.507, 5.508, 5.514, 280/5.515, 6.157
See application file for complete search history.

(56) References Cited

U.S. PATENT DOCUMENTS
5,027,048 A   6/1991   Masrur et al.
(Continued)

FOREIGN PATENT DOCUMENTS
JP   3 208715   9/1991
(Continued)

OTHER PUBLICATIONS

Extended European Search Report issued Oct. 19, 2010, in European Patent Application No. 07806130.6.

Primary Examiner — Paul N Dickson
Assistant Examiner — Joselynn Y Sliteris
(74) Attorney, Agent, or Firm — Oblon, Spivak, McClelland, Maier & Neustadt, L.L.P.

(57) ABSTRACT

It is an object of the invention to provide a suspension system configured to execute a control for avoiding a state in which an operation of an electric motor which is a power source of an electromagnetic actuator is kept halted at a certain operational position while the motor is generating a motor force. Where a target rotational position of the motor becomes equal to a specific operational position (e.g., a rotational position at which an electrifying current amount of one phase reaches a peak value), a control for shifting the target rotational position by $\delta\theta$ is executed. Where the rotational position of the motor is kept located at the certain position for a time period longer than a prescribed time, a control for changing the rotational position of the motor is executed. According to the present suspension system, it is possible to suppress imbalance in heat generation in the motor and to thereby reduce a load to be applied to the motor. Accordingly, a suspension system with high utility is realized.

17 Claims, 14 Drawing Sheets

U.S. PATENT DOCUMENTS 5,350,983 A 9/1994 Miller et al.
2006/0273747 A1 12/2006 Takeuchi

FOREIGN PATENT DOCUMENTS

| | | |
|---|---|---|
| JP | 2001-280416 | 10/2001 |
| JP | 2001 287660 | 10/2001 |
| JP | 2002-315383 | 10/2002 |
| JP | 2003 42224 | 2/2003 |
| JP | 2003 104025 | 4/2003 |
| JP | 2005 247078 | 9/2005 |
| JP | 2006 38115 | 2/2006 |
| JP | 2006 117210 | 5/2006 |

FIG.6
(a)
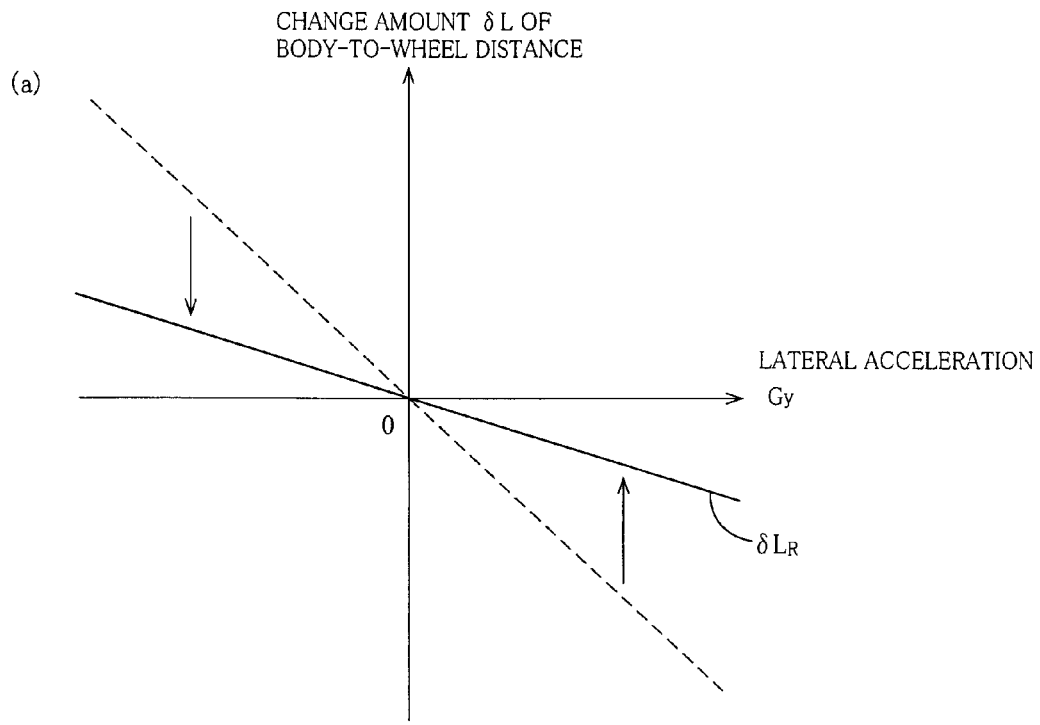
(b)
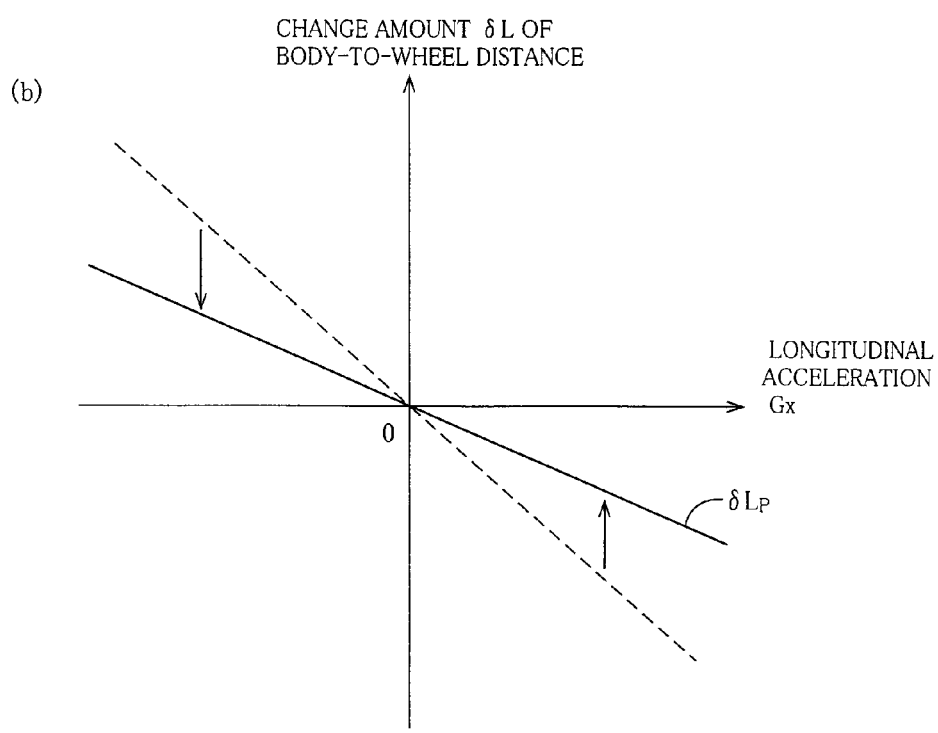

FIG.7
(a)
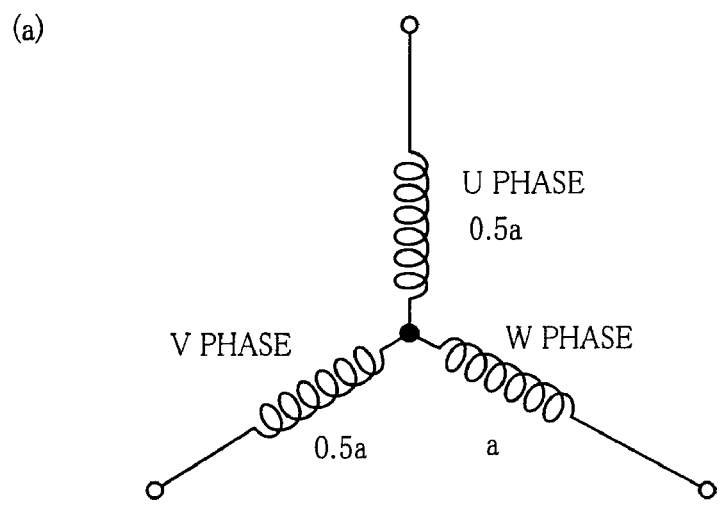
(b)
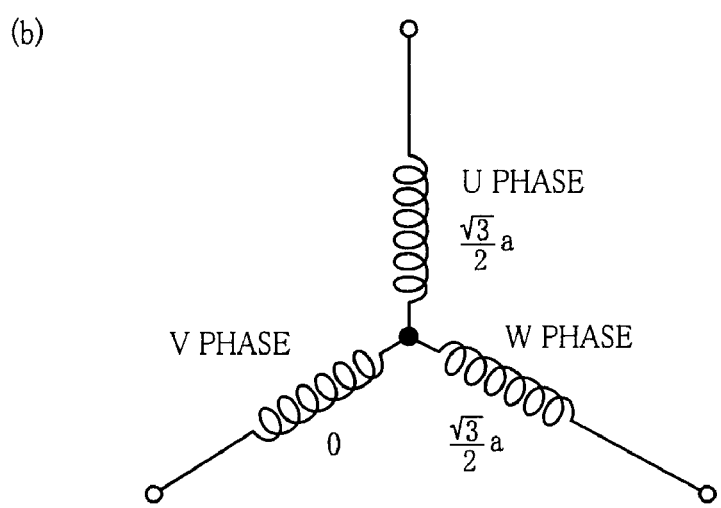

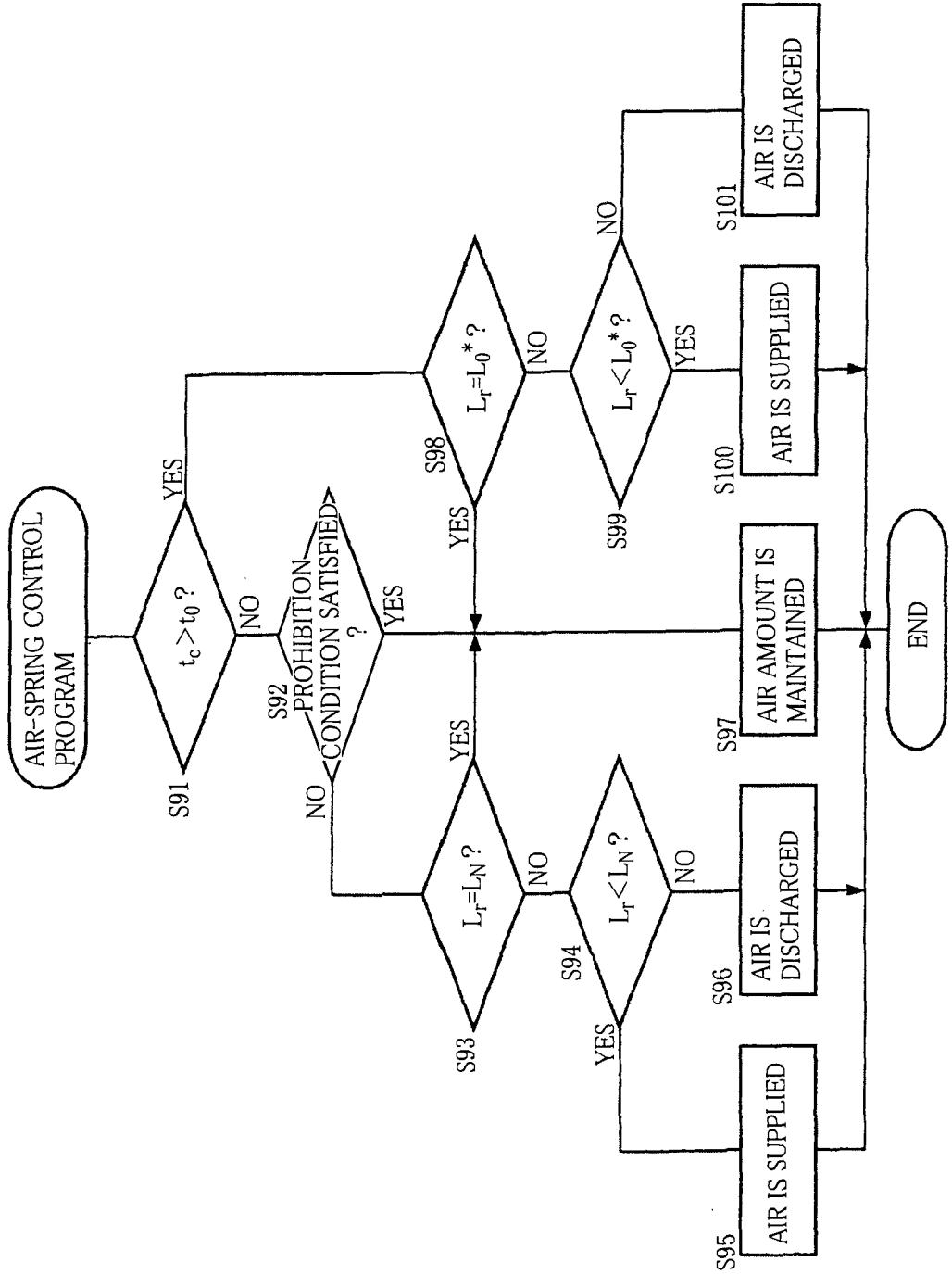

SUSPENSION SYSTEM FOR VEHICLE

TECHNICAL FIELD

The present invention relates to a suspension system including an electromagnetic actuator configured to generate a force by which a body and a wheel of a vehicle are moved toward and away from each other in a vertical direction.

BACKGROUND ART

In recent years, there has been developed, as a suspension system for a vehicle, a so-called electromagnetic suspension system including an electromagnetic actuator configured to generate a force by which a body and a wheel of a vehicle are moved toward and away from each other in a vertical direction. For instance, the following Patent Document 1 discloses such an electromagnetic suspension system. The disclosed suspension system is expected to be a high-performance suspension system in view of an advantage that it is possible to easily realize a suspension characteristic based on a so-called skyhook theory.
Patent Document 1 JP-A-2003-42224

DISCLOSURE OF THE INVENTION

(A) Summary of the Invention

Because the electromagnetic actuator is constantly kept operated during a running of the vehicle, heat generation of an electric motor as a power source is a serious problem that the electromagnetic actuator conventionally has been experienced. The system disclosed in the above-indicated Patent Document 1 deals with such a problem by reducing electric power consumption owing to a reduction in an electric current supplied to the actuator where an average consumption amount of the electric power within a certain time exceeds a predetermined upper limit value. The utility of the suspension system equipped with the electromagnetic actuator can be improved by thus taking some measures to deal with the heat generation of the electric motor. The present invention has been developed in the light of the situations described above. It is therefore an object of the invention to improve the utility of the suspension system equipped with the electromagnetic actuator.

To achieve the object indicated above, a suspension system for a vehicle according to the present invention is characterized in that the suspension system is configured to be capable of executing a control for avoiding a state in which an operation of an electric motor as a power source of an electromagnetic actuator is kept halted at a certain operational position while the motor is generating a motor force.

In the state in which the operation of the electric motor is kept halted at the certain operational position while the motor is generating the motor force, the amount of heat generation is not balanced among coils that constitute respective phases of the electric motor, thereby increasing a load to be applied to the electric motor. In the present suspension system configured to execute the above-described control, namely, an operation-halting-state avoiding control, such a state can be avoided to thereby reduce or suppress the heat generation of the electric motor. That is, the present suspension system is capable of reducing a load to be applied to the motor, thus assuring high utility.

(B) Forms of Invention

There will be explained below various forms of one or more non-limiting embodiments of the invention. It is to be understood that combinations of constituent elements that constitute the invention are not limited to those described in the following forms. That is, it is to be understood that one or more non-limiting embodiments of the invention shall be construed in light of the following descriptions of the various forms and preferred embodiments. It is to be further understood that any form in which one or more elements is/are added to or deleted from any one of the following forms may be considered as one form of the invention.

(1) A suspension system for a vehicle, comprising:
  an electromagnetic actuator which includes an electric motor and which generates, based on a motor force generated by the electric motor, an actuator force that is a force in a direction in which a body of the vehicle and a wheel are vertically moved toward and away from each other; and
  a control device which controls an operation of the electromagnetic actuator by controlling the electric motor,
  wherein the control device is configured to execute an operation-halting-state avoiding control for avoiding a state in which an operation of the electric motor is kept halted at a certain operational position while the motor is generating the motor force.

In an electromagnetic actuator (hereinafter simply referred to as "actuator" where appropriate) having an electric motor as a power source, where the electric motor is in a state in which its operation is kept halted at a certain position while a motor force is being generated by the motor (hereinafter abbreviated as "operation-halting state"), the electrifying state of the motor is constant, namely, the amount of electric current flowing through each of coils constituting respective phases of the motor is kept unchanged. Accordingly, the amount of electric current flowing through each coil (i.e., electrifying current amount) is not balanced among the coils, so that the amount of heat generated in each coil is not balanced among the coils. If such an undesirable condition persists, there may be a risk that the coil which suffers from excessive heat generation burns out, resulting in a large load to the motor and accordingly to the actuator. The form (1) aims at dealing with such a problem. According to the form (1), the above-described operation-halting state can be avoided, thereby mitigating imbalance of the heat generation in the electric motor and reducing the load thereto.

In a strict sense, the operation-halting-state avoiding control in the form (1) is defined as a control for avoiding a state in which the operation of the electric motor is kept located at least a specific position for a time longer than specified while the motor is generating a motor force. It is noted, however, that the control is not limited to a control to eliminate the state in which the operation of the motor is kept halted at the certain position for a time longer than specified, but may be a control to prevent or forestall an occurrence of such a state. As the operation-halting-state avoiding control, it is possible to employ, as will be explained in detail, a control to prevent an operation-halting state that will give a large influence on the motor by shifting a target operational position of the motor or a control to eliminate the operation-halting state by changing the operational position of the motor with a lapse of time. The operation-halting-state avoiding control may be employed in a system in which the motor is controlled according to a so-called position control technique, namely, in which is executed a control wherein the operational position of the electric motor or the operational position of the actuator is a direct control subject. Further, the operation-halting-state avoiding control may be employed in a system in which the motor is controlled according to a so-called force control technique, namely, in which is executed a control wherein the motor force or the actuator force is a direct control subject.

The structure and function of the electromagnetic actuator in the form (1) are not particularly limited. It is possible to employ an electromagnetic actuator having a function of changing a distance between the vehicle body and the wheel in the vertical direction (hereinafter referred to as "body-to-wheel distance" where appropriate) for restraining roll, pitch, and the like of the vehicle body or a function as a shock absorber, for instance. The electric motor in the form (1) may be a rotary motor or a linear motor, for instance, provided that the motor operates appropriately in accordance with the structure of the actuator. Where the rotary motor is employed, the operational position thereof is a rotational position and may be considered as a rotational angle.

(2) The suspension system according to the form (1), wherein the electromagnetic actuator is configured to change a distance between the body of the vehicle and the wheel in a vertical direction, in accordance with an operational position of the electric motor.

The actuator in the form (2) is utilized for restraining roll, pitch and the like of the vehicle body and adjusting a vehicle height. When the actuator is operated for the purposes described above, there is a good possibility that the electric motor falls into the above-indicated operation-halting state. In the operation-halting state, a relatively large amount of electric power continues to be supplied to the electric motor from the power source. Accordingly, the operation-halting-state avoiding control is particularly effective in a suspension system that employs an actuator for changing the body-to-wheel distance.

(3) The suspension system according to the form (1) or (2), wherein an operational position of the electric motor is determined by a relative position of a stationary element and a rotary element thereof.

The electric motor generally includes a stationary element and a movable element. Accordingly, the operational position of the electric motor can be determined by a relative position of the stationary element and the movable element. Such a determination is practical.

(4) The suspension system according to any one of the forms (1)-(3), wherein the control device is configured to execute the operation-halting-state avoiding control where the operation of the electric motor is kept halted at the certain operational position for a time period longer than specified.

In the form (4), the operation-halting-state avoiding control is executed on condition that the motor is actually kept halted at the certain operational position. According to the form (4), it is possible to avoid the electric motor from being kept halted at the certain operational position for a time period longer than specified. Therefore, the imbalance in the heat generation amount among the coils of the electric motor is suppressed, thereby reducing the load to be applied to the motor.

(5) The suspension system according to any one of the forms (1)-(4), wherein the control device is configured to execute the operation-halting-state avoiding control where the operation of the electric motor is kept halted at a specific operational position.

The "specific operational position" according to the form (5) includes an operational position where the imbalance in the heat generation amount among the coils of the motor is large and the load to the motor is accordingly large, for instance. Where such an operational position is made as the specific operational position, it is possible to avoid the load to the motor from becoming considerably large. The form (5) is not limited to an arrangement in which the operation-halting-state avoiding control is executed after the operation of the motor is halted at the specific operational position, but may be applicable to an arrangement in which the operation-halting-state avoiding control is executed when the operation of the motor is expected to be halted at the specific operational position. Where the electric motor is a brushless DC motor and is driven by inverters or the like, it is possible to employ, as a drive mode, mainly two modes, i.e., a sine-wave drive mode and a 120° rectangular-wave drive mode. The form (5) is particularly effective for a drive mode in which the electrifying current amount of each coil continuously changes in accordance with the operational position. In view of this, the form (5) is particularly effective when the sine-wave drive mode is employed.

(6) The suspension system according to the form (5), wherein the specific operational position is defined as a position at which an electrifying current amount of one of a plurality of phases of the electric motor is maximum.

In the form (6), the specific position is defined as an operational position at which there exists a phase whose electrifying current amount reaches a peak. At the operational position indicated above, the heat generation amount is maximum in that phase and the imbalance in the heat generation amount among the coils of the motor is maximum. According to the form (6), it is possible to avoid a situation in which the load to the motor is considerably large.

(7) The suspension system according to the form (5) or (6), wherein when the control device controls the operation of the electromagnetic actuator such that the operational position of the electric motor becomes equal to a target position, the control device executes, as the operation-halting-state avoiding control, a target-position shifting control for shifting the target position to a position different from the specific position in an instance where the target position is equal to the specific position.

The "target-position shifting control" in the form (7) is for changing, by shifting the target position, the operational position at which the operation of the electric motor is kept halted. It is desirable that the target position to be shifted from the specific operational position be a position at which the difference in the electrifying current amount among the phases of the electric motor is minimum from the viewpoint of reducing the imbalance in the heat generation amount. The target-position shifting control includes mainly two techniques as a technique for controlling the operational position of the electric motor. One of those is a direct control technique, more specifically described, a technique in which the operational position of the electric motor is directly controlled so as to become equal to the target position. The other is an indirect control technique, more specifically described, a technique in which the operational position of the motor is indirectly controlled such that a suitably set parameter (such as the body-to-wheel distance) that corresponds to the operational position becomes equal to a value that corresponds to the target position. The above-indicated target-position shifting control is applicable to a system that employs either of those two control techniques.

(8) The suspension system according to the form (7), wherein the target-position shifting control is a control in which the target position is shifted to an operational position at which there exist two or more phases having a maximum electrifying current amount among a plurality of phases of the electric motor.

In the form (8), the target position after being shifted by the target-position shifting control is limited. The form (8) is suitable where the motor is driven in a sine-wave drive mode. According to the form (8), the electrifying current amounts of the respective phases are leveled to a certain extent, so that the imbalance in the heat generation amount can be effectively restrained. Since the electrifying current amount of one of the phases whose electrifying current amount is maximum can be reduced, thereby largely reducing the load to be applied to the motor. Where the electric motor is a three-phase brushless DC motor and is driven in a sine-wave drive mode, the target position having been shifted is a position at which only two of the three phases are electrified, namely, a position at which the electrifying current amount of one of the three phases having the maximum electrifying current amount is minimum over the electric angle range of 360°.

(9) The suspension system according to any one of the forms (1)-(8), wherein the control device is configured to execute, as the operation-halting-state avoiding control, an operational-position changing control for changing an operational position of the electric motor.

In the form (9), the operational position is changed with a lapse of time. In short, the electric motor is not kept halted at the certain operational position. According to the form (9), the electrifying current amount of each phase is changed, whereby the imbalance in the heat generation amount in the motor is restrained.

(10) The suspension system according to the form (9), wherein the operational-position changing control is a control in which the operational position of the electric motor is periodically changed.

According to the form (10), the operational position of the electric motor is periodically changed, whereby the difference in the electrifying current amount among the phases of the motor can be made small, resulting in uniform heat generation in the motor.

(11) The suspension system according to the form (10), wherein the operational-position changing control is a control in which the operational position of the electric motor is changed at a frequency lower than a sprung resonance frequency.

(12) The suspension system according to the form (10), wherein the operational-position changing control is a control in which the operational position of the electric motor is changed at a frequency between a sprung resonance frequency and an unsprung resonance frequency.

In the above forms (11) and (12), the period at which the operational position of the electric motor is changed is limited. According to these forms, the operational position is changed at a frequency other than the sprung resonance frequency and the unsprung resonance frequency, so that an influence on the ride comfort felt by vehicle passengers is small. From the viewpoint of suppressing a deterioration in the ride comfort, it is desirable that the frequency be not greater than half the sprung resonance frequency in the form (11) while it is desirable, in the form (12), that the frequency be intermediate between the sprung resonance frequency and the unsprung resonance frequency, namely, it is desirable that the frequency be in a range within ±4 Hz from the average of the sprung resonance frequency and the unsprung resonance frequency. From the standpoint of causing the vehicle passengers not to feel changes in the operational position of the electric motor to the extent possible, the form (11) is preferably employed.

(13) The suspension system according to any one of the forms (9)-(12), wherein the operational-position changing control is a control in which the operational position of the electric motor is changed over an electrical angle range of 360°.

According to the form (13), the electrifying current amounts of the respective phases can be equalized. If the electrifying current amounts are equalized, the heat generation in the motor can be accordingly made uniform, thereby minimizing the load to the electric motor.

(14) The suspension system according to any one of the forms (9)-(13),
wherein the electromagnetic actuator is configured to change a distance between the body of the vehicle and the wheel in a vertical direction, in accordance with an operational position of the electric motor,
wherein the suspension system further comprises: (a) a hydrodynamic suspension spring elastically supporting the body of the vehicle and the wheel relative to each other and configured to change a spring length by a fluid inflow thereinto and a fluid outflow therefrom; and (b) an actuator-supporting spring disposed between the electromagnetic actuator and one of the body of the vehicle and the wheel and elastically supporting the electromagnetic actuator and the one of the body of the vehicle and the wheel relative to each other, and
wherein the control device is configured to further execute, in the operational-position changing control, a control in which the distance between the body of the vehicle and the wheel is kept constant by the fluid inflow and the fluid outflow into and from the hydrodynamic suspension spring, in accordance with a change of the operational position of the electric motor.

In the suspension system that employs the above-indicated hydrodynamic suspension spring, the body-to-wheel distance is changeable based on the function of the spring. In the form (14), the actuator is floatingly supported by the actuator-supporting spring, and a change in the body-to-wheel distance that arises from a change in the operational position of the actuator is eliminated in the operational-position changing control by utilizing the function of the hydrodynamic suspension spring to change the body-to-wheel distance. According to the form (14), even when the operational position of the electric motor is changed, the body-to-wheel distance does not change, thereby causing the vehicle passengers to be insensitive to the execution of the operation-position changing control.

The "hydrodynamic suspension spring" in the form (14) may include various sorts of springs such as a diaphragm-type air spring whose pressure chamber is filled with compressed air as a fluid and a hydraulic spring that includes: a cylinder in which a hydraulic oil as a fluid is filled; and an accumulator which communicates with the cylinder. The spring length of the suspension spring is an imaginary length of the suspension spring in a state in which the suspension spring is not generating a spring force. The above-indicated hydrodynamic suspension spring has a function of changing the spring length by the fluid inflow thereinto and the fluid outflow therefrom, thereby changing the body-to-wheel distance. In other words, the suspension spring has the function of changing the body-to-wheel distance by changing the spring force that can be generated at a certain body-to-wheel distance, namely, by changing the spring constant of the spring.

(15) The suspension system according to any one of the forms (1)-(14),
wherein the electromagnetic actuator is configured to change a distance between the body of the vehicle and the wheel in a vertical direction, in accordance with an operational position of the electric motor,
wherein the suspension system further comprises: (a) a hydrodynamic suspension spring elastically supporting the body of the vehicle and the wheel relative to each other and configured to change a spring length by a fluid inflow thereinto and a fluid outflow therefrom; and (b) an actuator-supporting spring disposed between the electromagnetic actuator and one of the body of the vehicle and the wheel and elastically supporting the electromagnetic actuator and the one of the body of the vehicle and the wheel relative to each other, and wherein the control device is configured to further execute, in the operation-halting-state avoiding control, a control to permit the fluid inflow and the fluid outflow into and from the hydrodynamic suspension spring to eliminate a change of the distance between the body of the vehicle and the wheel generated due to execution of the operation-halting-state avoiding control.

The form (15) is a superordinate concept of the above-described form adapted or customized for execution of the operational-position changing control. According to the form (15), the change in the body-to-wheel distance arising from the change in the operational position of the electric motor can be obviated not only when the operational-position changing control is executed as the operation-halting-state avoiding control, but also even when the other control such as the target-position shifting control is executed.

(16) The suspension system according to any one of the forms (1)-(15), further comprising a temperature detector for detecting a temperature of the electric motor, wherein the control device is configured to execute the operation-halting-state avoiding control when the temperature of the electric motor detected by the temperature detector becomes higher than a predetermined threshold.

In the form (16), the operation-halting-state control may be executed only when the temperature of the motor becomes relatively high, for instance. According to the form (16), the operation-halting-state control can be executed only when the necessity to execute the control is high. The temperature detector may be configured to detect individual temperatures in the respective phases of the motor, for instance. In this instance, the form (16) may be arranged such that the operational-halting-state avoiding control is executed when the temperature of any of the phases becomes higher than the predetermined threshold.

(17) The suspension system according to any one of the forms (1)-(16), comprising a plurality of electromagnetic actuators each as the electromagnetic actuator, the plurality of electromagnetic actuators corresponding to a plurality of wheels, wherein the control device is configured to execute the operation-halting-state avoiding control for each of the plurality of electromagnetic actuators.

In the form (17), the electromagnetic actuator is disposed for each of the plurality of wheels. The above-indicated forms may be employed in each of the electromagnetic actuators.

(18) The suspension system according to the form (17), wherein each of the plurality of electromagnetic actuators is configured to change a distance between the body of the vehicle and the wheel in a vertical direction, in accordance with an operational position of the corresponding electric motor, and wherein when the control device executes the operation-halting state avoiding control for each of two or more of the plurality of electromagnetic actuators, the control device synchronizes changes of the distances respectively corresponding to the two or more of the plurality of electromagnetic actuators to each other, the changes of the distances being generated due to execution of the operation-halting-state avoiding control.

The form (18) may employ, for instance, an arrangement in which the body-to-wheel distances that respectively correspond to the two or more of the electromagnetic actuators are changed at the same time in the same direction. The form (18) may further employ an arrangement in which the operational positions of the electric motors of the respective two or more of the electromagnetic actuators are changed such that the changes in the body-to-wheel distances that respectively correspond to the two or more of the electromagnetic actuators are mutually the same or an arrangement in which the operational positions are changed such that the changes have mutually the same period. The operation-halting-state avoiding control is executed during a control for maintaining the posture of the vehicle body. In this respect, it is desirable that the changes in the body-to-wheel distances that respectively correspond to the two or more of the electromagnetic actuators have mutually the same direction, speed, amount, and timing of initiation.

(19) The suspension system according to the form (18), wherein the control device is configured to execute, as the operation-halting-state avoiding control, an operational-position changing control for periodically changing the operational position of the electric motor, and wherein when the control device executes the operational-position changing control for the two or more of the plurality of electromagnetic actuators, the control device changes the operational position of the electric motor of each of the two or more of the plurality of actuators so as not to cause a deviation in the changes of the distances respectively corresponding to the two or more of the plurality of actuators.

In the form (19), in an instance where the operational-position changing control is executed, the body-to-wheel distances that respectively correspond to the two or more of the electromagnetic actuators are synchronized. The deviation in the changes of the distances respectively corresponding to the two or more of the plurality of actuators means a deviation in any of the direction, the speed, and the amount, of the changes.

(20) The suspension system according to any one of the forms (17)-(19), wherein each of the plurality of electromagnetic actuators is configured to change a distance between the body of the vehicle and the wheel in a vertical direction, in accordance with an operational position of the corresponding electric motor, and wherein when the control device executes the operation-halting-state avoiding control for each of at least one of the plurality of electromagnetic actuators, the control device executes, for each of the other of the plurality of electromagnetic actuators, a change following control in which the distance corresponding to each of the other of the plurality of electromagnetic actuators is changed in accordance with a change of the distance corresponding to the at least one of the plurality of electromagnetic actuators, the change being generated due to execution of the operation-halting-state avoiding control.

According to the form (20), even when the operation-halting-state avoiding control is executed for a part of the plurality of actuators, it is possible to change the body-to-wheel distance of each of the actuators for which the operation-halting-state avoiding control is not being executed. Accordingly, the movement of the vehicle body can be made appropriate even in such an instance where the operation-halting-state avoiding control is executed for a part of the plurality of actuators. Where the operation-halting-state avoiding control is executed for one of the plurality of actuators, the form (20) may be arranged to execute the change-following control in which the change in the body-to-wheel distance corresponding to each of the other actuators are made equal to the change in the body-to-wheel distance generated due to the operation-halting-state avoiding control, whereby the vehicle body can be moved in the vertical direction while the vehicle body is kept in its inclined state.

The following arrangement may be feasible though it does not belong to the above form (20). That is, where the operation-halting-state avoiding control is executed for one of the plurality of actuators, the operational position of the electric motor is changed, by the operation-halting-state avoiding control, only in a direction in which the vehicle body and the wheel move toward each other. According to the arrangement, it is possible to maintain the inclined state of the vehicle body at each of the wheels corresponding to the actuators for which the operation-halting state avoiding control is not executed, depending upon the positional relationship between the center of gravity of the vehicle body and the one of the plurality of actuators.

(21) The suspension system according to the form (20), wherein the change following control is a control in which the body of the vehicle is moved in the vertical direction without changing an angle of inclination of the body of the vehicle.

In the form (21), the changes in the body-to-wheel distances that correspond to the respective wheels are controlled to be mutually the same. According to the form (21), the posture of the vehicle body that is inclined with respect to the road surface is maintained when the operation-halting-state avoiding control is executed. More specifically described, in the target-position shifting control, the direction and the amount of the change in the body-to-wheel distance are made common among the wheels. In the operational-position changing control, the amount of change with a lapse of time is made common among the wheels. The "angle of inclination" in the form (21) is a concept that includes an angle of the vehicle body in a state in which the vehicle body is not inclined with respect to the road surface. More specifically, an angle of inclination of 0° is included. The form (21) includes an arrangement to execute the change following control such that the state in which the vehicle body is not inclined is maintained.

(22) The suspension system according to any one of the forms (1)-(21), wherein the control device is configured to execute a control in which the actuator force generated by the electromagnetic actuator acts as a damping force with respect to a motion of the body of the vehicle and the wheel toward and away from each other.

In the system according to the form (22), the actuator passively functions, namely, the actuator functions as a shock absorber (also called a damper), whereby the form (22) is made as a system capable of generating a damping force with respect to at least one of sprung vibration and unsprung vibration, for instance.

(23) The suspension system according to any one of the forms (1)-(22), wherein the electromagnetic actuator includes: an external thread portion configured to be immovable relative to one of a sprung member and an unsprung member; and an internal thread portion configured to be immovable relative to the other of the sprung portion and the unsprung portion, to engage the external thread portion, and to rotate relative to the external thread portion in association with a motion of the body of the vehicle and the wheel toward and away from each other, and wherein the electromagnetic actuator is configured to generate the actuator force by giving a relative rotational force to the external thread portion and the internal thread portion by the electric motor.

In the form (23), the electromagnetic actuator is limited to the one that employs a so-called screw mechanism. Where the screw mechanism is employed, the electromagnetic actuator can be easily constructed. In the form (23), it is arbitrarily determined on which one of the sprung member and the unsprung member the external thread portion is provided and on which one of the sprung member and the unsprung member the internal thread portion is provided. Further, the external thread portion may be configured to be unrotatable while the internal thread portion may be configured to be rotatable. Conversely, the internal thread portion may be configured to be unrotatable while the external thread portion may be configured to be rotatable.

(24) The suspension system according to any one of the forms (1)-(23), wherein the electric motor is a three-phase brushless DC motor.

The connection of the three phases of the motor in the form (24) may be a star connection or a delta connection. Further, the drive mode of the motor is not particularly limited, but may be selected from various drive modes such as a rectangular-wave drive mode and a sine-wave drive mode.

(25) The suspension system according to the form (24), wherein the control device includes a drive circuit configured to drive the electric motor in a sine-wave drive mode.

In the form (25), the driving method of the motor is limited. The form (25) permits a low-vibration, low-noise actuator with smooth rotation of the electric motor.

BRIEF DESCRIPTION OF THE DRAWINGS

FIG. 6(*a*) is a view showing a relationship between lateral acceleration generated in a vehicle body and an amount of change in a body-to-wheel distance and FIG. 6(*b*) is a view showing a relationship between longitudinal acceleration generated in the vehicle body and the amount of change in the body-to-wheel distance.

FIG. 7(*a*) is a view showing an electrifying current amount of each phase at a specific position of the electric motor and FIG. 7(*b*) is a view showing an electrifying current amount of each phase at an operational position after having been shifted by a target-position shifting control.

FIG. 14 is a flow chart showing an air-spring control program executed in the suspension system according to the second embodiment.

BEST MODE FOR CARRYING OUT THE INVENTION

There will be explained in detail some embodiments of the claimable invention with reference to the drawings. It is to be understood, however, that the claimable invention is not limited to the following embodiments but may be embodied with various changes and modifications, such as those described in the FORMS OF THE INVENTION, which may occur to those skilled in the art.

(A) First Embodiment

1. Structure and Function of Suspension System

Figure 1:
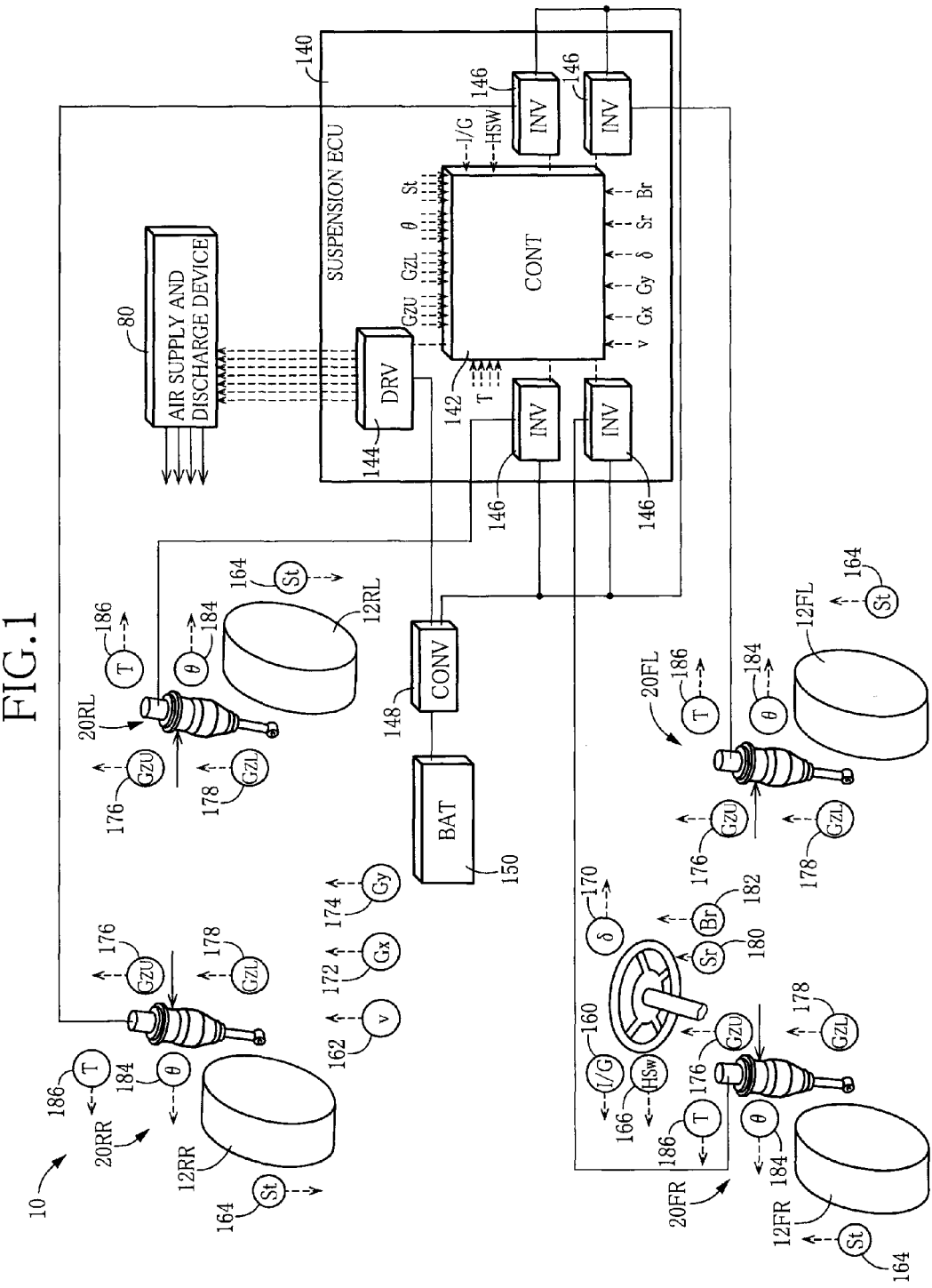
FIG. 1 is a schematic view illustrating an overall structure of a suspension system for a vehicle according to a first embodiment.

FIG. 1 schematically shows a suspension system 10 for a vehicle according to a first embodiment. The suspension system 10 includes four independent suspension apparatus which respectively correspond to four wheels 12 (i.e., a front left wheel, a front right wheel, a rear left wheel, and a rear right wheel). Each of the suspension apparatus includes a spring•absorber Assy 20 in which a suspension spring and a shock absorber are united. The four wheels 12 and the four spring•absorber Assys 20 are collectively referred to as the wheel 12 and the spring•absorber Assy 20, respectively. Where it is necessary to distinguish the four wheels 12 from each other and to distinguish the four spring•absorber Assys 20 form each other, there are attached suffixes "FL", "FR", "RL", and "RR" respectively indicating the front left wheel, the front right wheel, the rear left wheel, and the rear right wheel.

Figure 2:
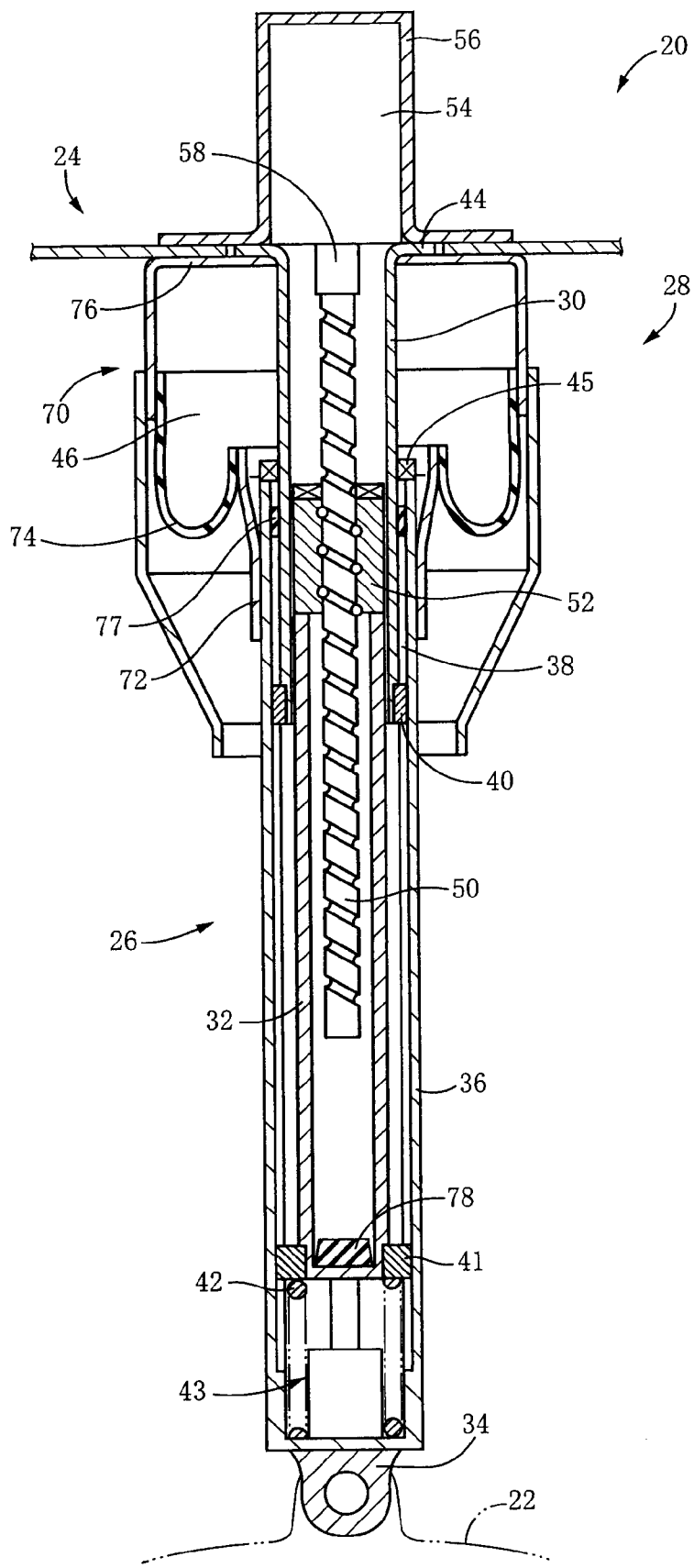
FIG. 2 is a front elevational view illustrating a spring•absorber Assy shown in FIG. 1.

As shown in FIG. 2, the spring•absorber Assy 20 is disposed between a suspension lower arm 22 as an unsprung member for holding the wheel 12 and a mount portion 24 as a sprung member provided on a body of the vehicle. The spring•absorber Assy 20 includes an actuator 26 as an electromagnetic absorber and an air spring 28 as a hydrodynamic suspension spring juxtaposed with the actuator 26.

The actuator 26 includes an outer tube 30 and an inner tube 32 which is inserted into the outer tube 30 so as to protrude downwardly from a lower end of the outer tube 30. The outer and inner tubes 30, 32 are inserted into and accommodated in a cover tube 36 that is connected to the lower arm 22 via a connecting member 34. The cover tube 36 is formed with, on its inner wall surface, a pair of guide grooves 38 that extend in a direction in which an axis of the actuator 26 extends (hereinafter referred to as "axis direction" where appropriate). Into the pair of guide grooves 38, a pair of keys 40 disposed at the lower end of the outer tube 30 and a pair of keys 41 disposed at a lower end of the inner tube 32 are fitted. Owing to the guide grooves 38 and the keys 40 fitted therein, the cover tube 36 and the outer tube 30 are made unrotatable relative to each other and movable relative to each other in the axis direction. Owing to the guide grooves 38 and the keys 41 fitted therein, the cover tube 36 and the inner tube 32 are made unrotatable relative to each other and movable relative to each other in the axis direction. Accordingly, in the structure described above, the outer tube 30 and the inner tube 32 are made unrotatable relative to each other and movable relative to each other in the axis direction.

Between a lower surface of the inner tube 32 and an inner bottom portion of the cover tube 36, a coil spring 42 is disposed. The coil spring 42 is disposed in series with the actuator 26 between the lower arm 22 and the actuator 26 and functions as an actuator supporting spring for elastically supporting the lower arm 22 and the actuator 26 relative to each other. Between a lower surface of the inner tube 32 and the inner bottom portion of the cover tube 36, there is also disposed a hydraulic damper 43, a structure of which is not illustrated in FIG. 2. The damper 43 is configured to generate a damping force with respect to a relative motion of the actuator 26 and the lower arm 22 that are supported by the coil spring 42 relative to each other. It is noted that a damping coefficient of the damper 43 is set at a value suitable for suppressing transmission of a relatively high-frequency vibration from the unsprung member to the sprung member. The actuator 26 is thus connected to the unsprung member and is connected to the sprung member such that the outer tube 30 is connected, at a flange portion 44 formed at its upper end, to the mount portion 24. At an upper end of the cover tube 36, a seal 45 is attached to prevent leakage of air from a pressure chamber 46 of an air spring 28 as explained below.

The actuator 26 includes: a ball screw mechanism having a threaded rod 50 as an external thread portion and a nut 52 as an internal thread portion which holds bearing balls and which screws the rod 50; and an electric motor 54 (hereinafter simply referred to as "motor 54" where appropriate). The motor 54 is fixedly accommodated in a motor casing 56. A flange portion of the motor casing 56 is fixed to an upper surface of the mount portion 24 while the flange portion 44 of the outer tube 30 is fixed to the flange portion of the motor casing 56, whereby the outer tube 30 is connected to the mount portion 24 via the motor casing 56. A motor shaft 58 which is a rotational shaft of the motor 54 is connected integrally to an upper end of the threaded rod 50. That is, the threaded rod 50 is disposed in the outer tube 30 so as to continuously extend from the motor shaft 58 and is rotated by the motor 54. The nut 52 is fixed to an upper end portion of the inner tube 32 and is held in engagement with the threaded rod 50 in the fixed state.

The air spring 28 includes a housing 70 fixed to the mount portion 24, an air piston 72 fixed to the cover tube 36, and a diaphragm 74 that connects the housing 70 and the air piston 72. The housing 70 is a generally cylindrical member having a cap portion 76. The housing 70 is fixed at an upper surface of the cap portion 76 thereof to a lower surface of the mount portion 24, such that the outer tube 30 of the actuator 26 passes through a hole formed in the cap portion 76. The air piston 72 has a generally cylindrical shape and fixed to an upper portion of the cover tube 36 such that the cover tube 36 is inserted thereinto. The housing 70 and the air piston 72 are connected to each other via the diaphragm 74 so as to maintain air tightness in the housing 70 and the air piston 72, whereby the pressure chamber 46 is formed by the housing 70, the air piston 72, and the diaphragm 74. The pressure chamber 46 is filled with compressed air as a fluid. In the structure described above, the air spring 28 elastically supports the lower arm 22 and the mount portion 24 relative to each other, namely, elastically supports the vehicle body and the wheel 12 relative to each other, by the pressure of the compressed air.

In the structure described above, when the vehicle body and the wheel 12 move toward and away from each other, the outer tube 30 and the inner tube 32 can be moved relative to each other in the axis direction. In accordance with the relative movement of the outer and inner tubes 30, 32, the threaded rod 50 and the nut 52 are moved relative to each other in the axis direction while the threaded rod 50 rotates relative to the nut 52. The motor 54 is configured to give a rotational torque to the threaded rod 50 and to generate a resistance force against the movement of the vehicle body and the wheel 12 toward and away from each other, owing to the rotational torque. The resistance force is utilized as a damping force with respect to the movement of the vehicle body and the wheel 12 toward and away from each other, whereby the actuator 26 functions as a so-called absorber (damper). In other words, the actuator 26 has a function of giving a damping force with respect to the relative movement of the vehicle body and the wheel 12 owing to an actuator force thereof generated in the axis direction. The actuator 26 also has a function of utilizing the actuator force as a propulsive force or drive force with respect to the relative movement of the vehicle body and the wheel 12. According to the function, it is possible to execute a shyhook control based on a sprung absolute speed. Further, the actuator 26 has a function of positively changing a distance between the vehicle body and the wheel in a vertical direction (hereinafter referred to as "body-to-wheel distance" where appropriate) and maintaining the body-to-wheel distance at a suitable distance, by the actuator force. Owing to the function, it is possible to effectively restrain roll of the vehicle body upon turning and pitch of the vehicle body upon acceleration and deceleration and to adjust the height of the vehicle.

An annular cushion rubber 77 is attached on an inner wall surface at the upper end of the cover tube 36 while a cushion rubber 78 is attached to an inner bottom surface of the inner tube 32. When the vehicle body and the wheel 12 move toward and away from each other, the keys 40 abut on the cushion rubber 77 where the vehicle body and the wheel 12 move relative to each other to a certain extent in a direction away from each other (hereinafter referred to as "rebound direction" where appropriate). On the other hand, where the vehicle body and the wheel 12 move relative to each other to a certain extent in a direction toward each other (hereinafter referred to as "bound direction" where appropriate), a lower end of the threaded rod 50 abuts on an inner bottom surface of the inner tube 32 via the cushion rubber 78. That is, the spring•absorber Assy 20 has stoppers (i.e., so-called bound stopper and rebound stopper) with respect to the movement of the vehicle body and the wheel 12 toward and away from each other.

Figure 3:
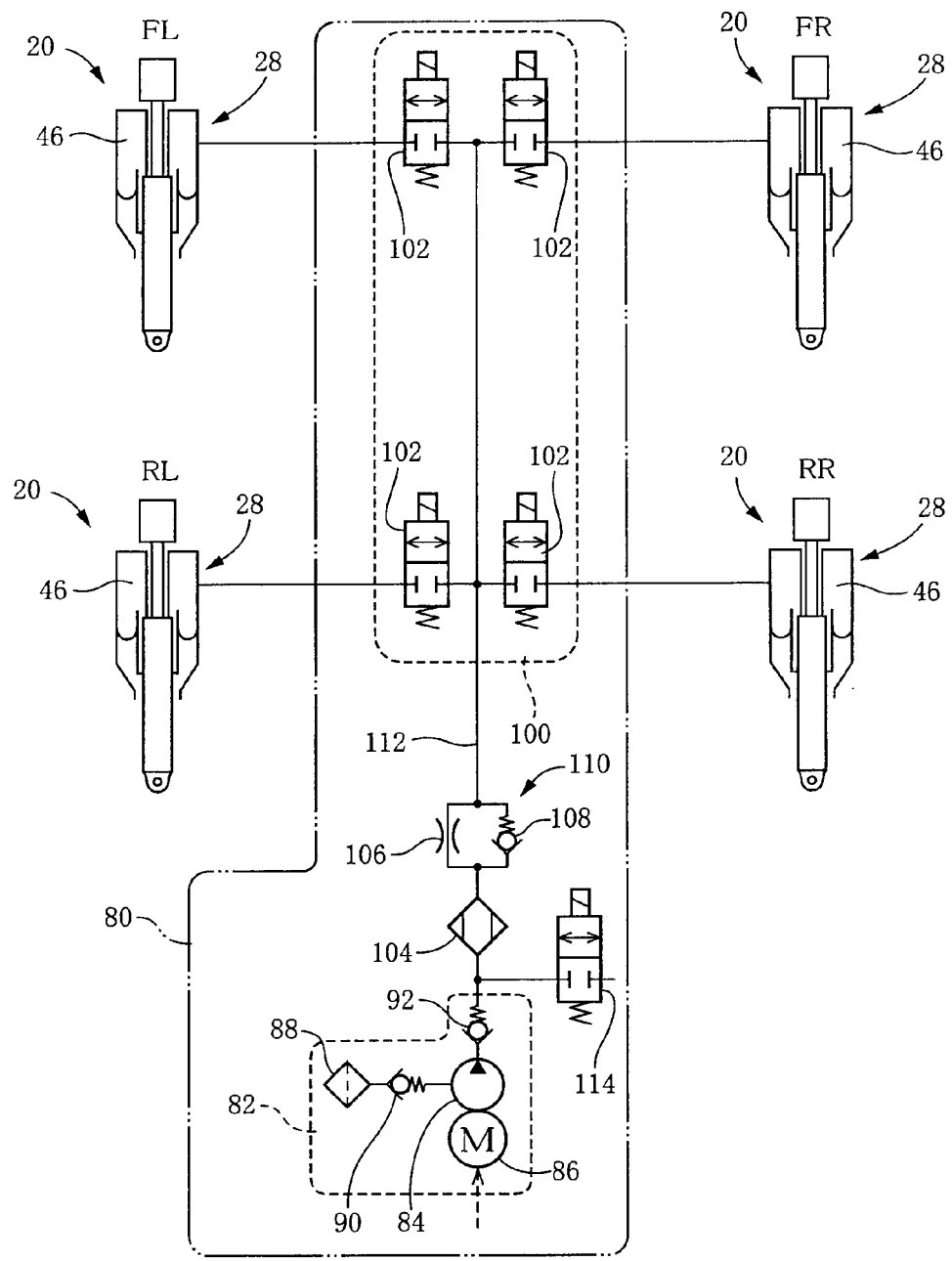
FIG. 3 is a schematic view illustrating the spring•absorber Assys shown in FIG. 1 and an air supply and discharge device.

The suspension system 10 has a fluid inflow and outflow device for permitting air as a fluid to flow into and flow out of the air spring 28 of each spring•absorber Assy 20, more specifically, an air supply and discharge device 80 that is connected to the pressure chamber 46 of each air spring 28 for supplying the air into the pressure chamber 46 and discharging the air from the same 46. FIG. 3 schematically shows the air supply and discharge device 80. The air supply and discharge device 80 includes a compressor 82 for supplying the compressed air to the pressure chamber 46 of each air spring 28. The compressor 82 includes a pump 84 and a pump motor 86 for driving the pump 84. The air in the atmosphere is sucked by the pump 84 via a filter 88 and a check valve 90 and is emitted via a check valve 92 while being pressurized. The compressor 82 is connected to the pressure chambers 46 of the respective four air springs 28 via an individual control valve device 100. The individual control valve device 100 includes four normally-closed individual control valves 102 provided so as to correspond to the respective pressure chambers 46 of the air springs 28. The individual control valve device 100 is for opening and closing fluid passages connected to the respective pressure chambers 46. The compressor 82 and the individual control valve device 100 are connected through a common passage 112 via a drier 104 for removing a water component from the compressed air and an air-flow restricting device 110 in which a restrictor 106 and a check valve 108 are disposed in parallel with each other. The common passage 112 is branched between the compressor 82 and the drier 104, and an air-discharge control valve 114 is disposed at a branched portion to discharge the air from the pressure chambers 46.

In the thus constructed suspension system 10, the air amount in the pressure chamber 46 of each air spring 28 can be adjusted by the air supply and discharge device 80. By adjusting the air amount, a spring length of each air spring 28 can be changed and the body-to-wheel distance for each wheel 12 is thereby changed. More specifically explained, the air amount in the pressure chamber 46 is increased for thereby increasing the body-to-wheel distance, and the air amount in the pressure chamber 46 is decreased for thereby decreasing the body-to-wheel distance.

In the suspension system 10, the spring•absorber Assy 20 is operated by a suspension electronic control unit (ECU) 140, namely, the actuator 26 and the air spring 28 are controlled by the ECU 140. More specifically, the operation of the motor 54 of the actuator 26 and the operation of the air supply and discharge device 80 are controlled by the ECU 140. The ECU 140 includes: a controller 142 constituted principally by a computer equipped with a CPU, a ROM, a RAM, etc.; a driver 144 as a drive circuit for the air supply and discharge device 80; and inverters 146 each as a drive circuit which correspond to the respective motors 54 of the actuators 26. The driver 144 and the inverters 146 are connected, via a converter 148, to a battery 150 as a power supply source. The battery 150 supplies an electric power to the individual control valves 102, the pump motor 86, etc., of the air supply and discharge device 80 and the motors 54 of the respective actuators 26. The motor 54 is driven at a constant voltage. Accordingly, the amount of electric power supplied to the motor 54 is changed by changing the amount of electric current supplied thereto, and the force of the motor 54 depends on the amount of the electric current supplied thereto.

The vehicle is provided with: an ignition switch [I/G] 160; a vehicle speed sensor [v] 162 for detecting a running speed of the vehicle (hereinafter referred to as "vehicle speed"); four stroke sensors [St] 164 respectively detecting the body-to-wheel distances for the respective wheels 12; a vehicle-height change switch [HSw] 166 operated by a vehicle driver for sending directions to change a vehicle height; an operation-angle sensor [δ] 170 for detecting an operation angle of a steering wheel; a longitudinal acceleration sensor [Gx] 172 for detecting actual longitudinal acceleration generated actually in the vehicle body; a lateral acceleration sensor [Gy] 174 for detecting actual lateral acceleration generated actually in the vehicle body; four vertical acceleration sensors [$Gz_U$] 176 respectively for detecting vertical acceleration of the mount portions 24 of the vehicle body corresponding to the respective wheels 12; four vertical acceleration sensors [$Gz_L$] 178 respectively for detecting vertical acceleration of the respective wheels 12; a throttle sensor [Sr] 180 for detecting an opening of an accelerator throttle; a brake-pressure sensor [Br] 182 for detecting a master cylinder pressure of a brake system; resolvers [θ] 184 each as a rotational angle sensor for detecting a rotational angle of the corresponding motor 54; and temperature sensors [T] 186 each for detecting a temperature of the corresponding motor 54. These sensors and switch are connected to the controller 142, and the ECU 140 is configured to control the operation of each spring•absorber Assy 20 based on signals sent from the sensors and switch.

The symbol in each square bracket is used in the drawings to indicate the corresponding sensor or switch.

In the ROM of the computer of the controller 142, there are stored a program for determining a target height, a program relating to the control of the actuator 26, a program relating to the control of the air spring 28, and various data. In the present suspension system 10, there are set, as a predetermined vehicle height which is selectable by the vehicle driver, three predetermined heights, namely, a predetermined normal height (N height), a predetermined large height (Hi height) which is larger than the normal height, and a predetermined small height (Low height) which is smaller than the normal height. When the vehicle driver operates the vehicle-height change switch 166, the vehicle height is changed to a selected one of the predetermined vehicle heights. The vehicle-height change switch 166 is configured to generate a command to change the predetermined height toward the large height or toward the small height, namely, to generate a height-increase command or a height-decrease command.

2. Structure of Inverter

Figure 4:
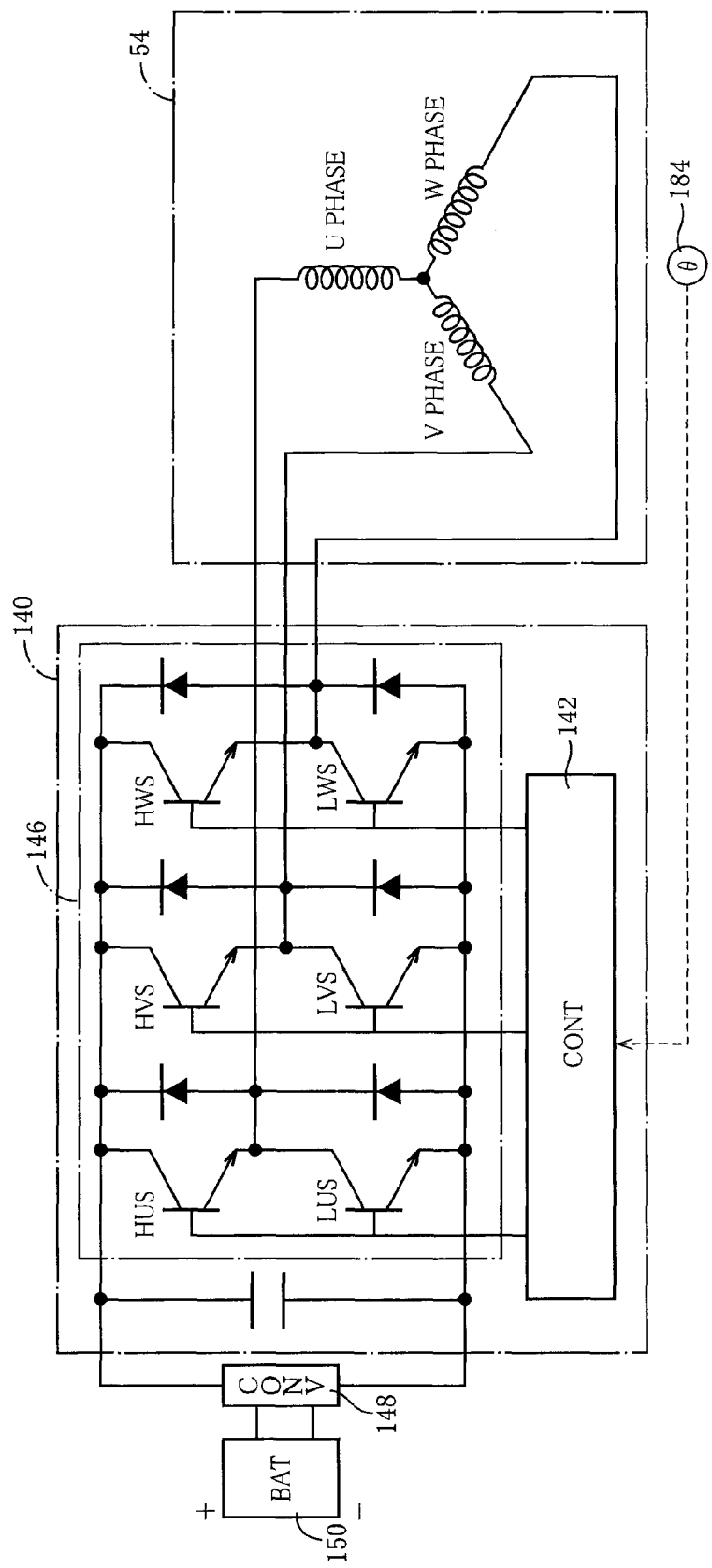
FIG. 4 is a circuitry diagram of an inverter for driving an electric motor of an actuator shown in FIG. 2.
Figure 5:
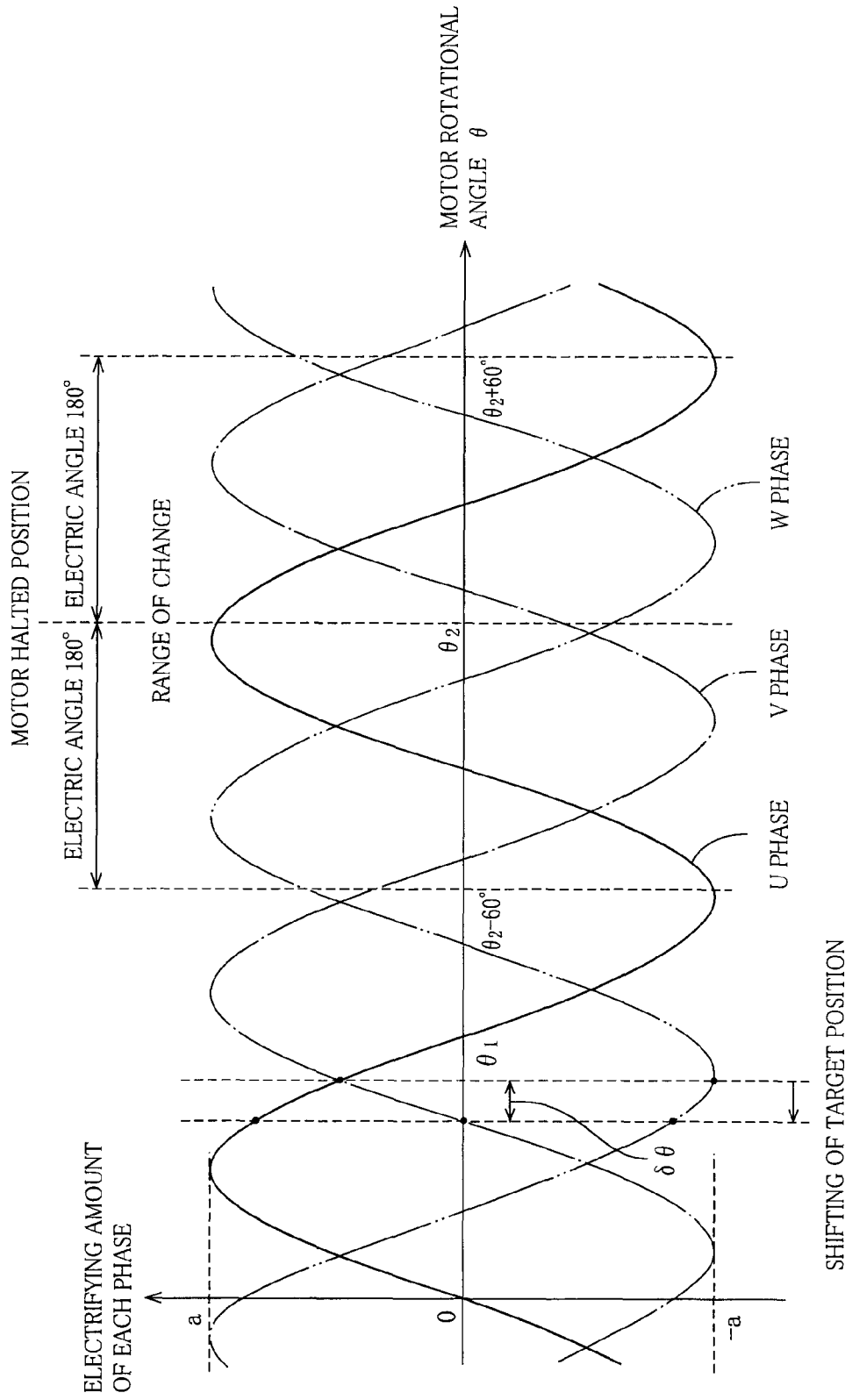
FIG. 5 is a view illustrating waveforms of electric currents supplied to respective phases of the electric motor by the inverter of FIG. 4.

As shown in FIG. 4, the motor 54 of each actuator 26 is a three-phase brushless motor in which coils are star-connected (y-connected), and is driven by the inverter 146. While not shown in the drawings, the motor 54 includes a stator having nine coils and a six-pole magnetic rotor. The motor rotational angle (i.e., the rotor rotational angle) of 120° corresponds to an electric angle of 360°. The inverter 146 has a known, ordinary structure as shown in FIG. 4 and includes high-side (high-voltage side) switching elements and low-side (low-voltage side) switching elements for respective three phases (U, V, W) of the motor 54, namely, six switching elements HUS, HVS, HWS, LUS, LVS, LWS. The controller 142 of the ECU 140 is configured to judge the motor rotational angle (the electric angle) by the resolver 184 of the corresponding motor 54 and control the switching elements to be opened and closed based on the motor rotational angle. The inverter 146 drives the motor 54 in a so-called sine-wave drive mode. More specifically explained, the amount of electric current of each of the three phases of the motor 54 changes in a sinusoidal waveform as shown in FIG. 5, and the phases are controlled to differ from each other by the electric angle of 120°. The inverter 146 electrifies the motor 54 according to a pulse width modulation (PWM) control in which the controller 142 changes a duty ratio, i.e., a ratio of a pulse-on time to a pulse-off time, thereby changing the amount of the electric current passing through the motor 54 (i.e., the electrifying current amount) and accordingly changing the magnitude of the rotational torque generated by the motor 54. That is, the duty ratio is made large, whereby the electrifying current amount of the motor 54 is made large and the rotational torque generated by the motor 54 is accordingly made large. On the contrary, the duty ratio is made small, whereby the electrifying current amount of the motor 54 is made small and the rotational torque generated by the motor 54 is accordingly made small.

The direction of the rotational torque generated by the motor 54 is the same as a direction in which the motor actually rotates or contrary to the direction. When the direction of the rotational torque generated by the motor 54 is contrary to the rotational direction of the motor 54, namely, when the actuator 26 applies the actuator force as the resistance force (the damping force) with respect to the relative movement of the wheel and the vehicle body, the force generated by the motor 54 does not necessarily depend on the electric power supplied from the power source. More specifically explained, there are instances where an electromotive force is generated in the motor 54 owing to rotation of the motor 54 by an external force and the motor 54 generates the motor force based on the electromotive force, namely, there are instances where the actuator 26 generates the actuator force based on the electromotive force. In such instances, the power generated by the electromotive force can be regenerated into the power source through the inverter 146. The above-described PMW control of the switching elements is also arranged to control the electric current amount passing through each of the coils of the motor 54 by the electromotive force. Even when the direction of the rotational torque generated by the motor 54 and the rotational direction of the motor 54 are contrary to each other, the magnitude of the rotational torque generated by the motor 54 is changed by changing the duty ratio. In other words, the inverter 146 is configured to control the motor force by controlling the electric current passing through each coil of the motor 54, namely, by controlling the electrifying current of the motor 54, irrespective whether the electric current is supplied from the power source or generated by the electromotive force.

3. Basic Control in Suspension System

In the present suspension system 10, the four spring•absorber Assys 20 can be controlled independently of each other. In the four spring•absorber Assys 20, the actuator force of the actuator 26, more specifically, the electrifying current amount of the motor 54, is independently controlled, whereby there are executed: a control for damping the vibration of the vehicle body and the wheel 12, namely, the sprung vibration and the unsprung vibration (hereinafter referred to as "vibration damping control"); and a control for controlling the posture of the vehicle (hereinafter referred to as "body-posture control") in which are integrated (a) a control for restraining roll of the vehicle body (hereinafter referred to as "roll restrain control"), (b) a control for restraining pitch of the vehicle body (hereinafter referred to as "pitch restrain control"), and (c) a control for temporarily changing the vehicle height for improving the running stability of the vehicle during high-speed running, ensuring ease of ingress/egress of passengers to/from the vehicle, and so on (hereinafter referred to as "actuator-dependent height change control"). In the above-indicated vibration damping control and body-posture control, a target electrifying current amount is determined by summing a vibration damping component and a body-posture component each as a component of the electrifying current amount of the motor 54 in the corresponding control. The actuator 26 is controlled so as to generate the actuator force in accordance with the determined target electrifying current amount, whereby the vibration damping control and the body-posture control are executed in a unified manner. Further, in the present suspension system 10, there is executed a control for changing the vehicle height based on an intention of the driver for the purpose of coping with running over a bad road and so on (hereinafter referred to as "air-spring-dependent height change control"). In the following explanation, the electrifying current amount of the motor 54 and its component are positive values when corresponding to a force in the rebound direction in which the body and the wheel 12 move away from each other and negative values when corresponding to a force in the bound direction in which the body and the wheel 12 move toward each other.

3-1. Air-Spring-Dependent Height Change Control

The air-spring-dependent height change control for changing the vehicle height by the air spring 28 is executed when the target height to be realized is changed by an operation of the vehicle-height change switch 166 based on an intension of the driver. For each of the above-indicated three predetermined heights, a target body-to-wheel distance for each of the four wheels 12 is set in advance. The operation of the air supply and discharge device 80 is controlled such that the body-to-wheel distances for the respective wheels 12 become equal to the respective target distances, based on the values detected by the respective stroke sensors 164, whereby the body-to-wheel distances for the respective wheels 12 are suitably changed in accordance with the target height. In the suspension system 10, where the vehicle speed v becomes equal to or higher than a threshold speed $v_0$ (e.g., 50 km/h) at the Hi height, the vehicle height is changed back to the N height in view of the running stability of the vehicle. The air-spring-dependent height change control is executed also in such an instance. In the air-spring-dependent height change control, there is also executed, for instance, a so-called "auto leveling" for coping with a change in the vehicle height due to a change in the number of passengers riding on the vehicle, a change in the weight of the cargos carried by the vehicle, and the like.

The air-spring-dependent height change control will be explained in more detail. In the operation of the air supply and discharge device 80 for increasing the vehicle height (hereinafter referred to as "height-increase operation"), the pump motor 86 is initially activated and all of the individual control valves 102 are opened, whereby the compressed air is supplied to the pressure chambers 46 of the respective air springs 28. After this state is maintained, the individual control valves 102 are closed in order when the body-to-distances for the corresponding wheels 12 become equal to the respective target distances. When the body-to-wheel distances for all of the four wheels 12 become equal to the respective target distances, the pump motor 86 is deactivated. On the other hand, in the operation of the air supply and discharge device 80 for decreasing the vehicle height (hereinafter referred to as "height-decrease operation"), the air discharge control valve 114 is opened and all of the individual control valves 102 are opened, whereby the air in the pressure chambers 46 of the respective air springs 28 is allowed to be discharged into the atmosphere. Thereafter, the individual control valves 102 are closed in order when the body-to-distances for the corresponding wheels 12 become equal to the respective target distances. When the body-to-wheel distances for all of the four wheels 12 become equal to the respective target distances, the air discharge control valve 114 is closed. Where the above-described auto leveling is executed, the individual control valve(s) 102 corresponding to the wheel(s) 12 at which the body-to-wheel distance needs to be changed is/are opened, whereby the air is supplied or discharged.

It is noted, however, that the above-described height-increase operation and height-decrease operation are prohibited from being executed when a particular prohibition condition (hereinafter referred to as "height-change prohibition condition") is satisfied. More specifically explained, the operation of the air supply and discharge device 80 is prohibited when one of the following is satisfied: (1) the roll moment or the pitch moment is acting on the vehicle body; (2) at least one of the vehicle body and the wheel 12 is moving in the vertical direction; and (3) any of the body-to-wheel distances of the respective four wheels does not fall within a prescribed permissible range. When the prohibition condition is satisfied, the individual control valves 102 are closed and the pump motor 86 is deactivated or the air discharge control valve 114 is closed, so that the amount of the air in each of the pressure chambers 46 of the respective air springs 28 is kept maintained at the value upon closure of the individual control valves 102.

3-2. Body-Posture Control

The body-posture control is for controlling the posture of the vehicle body by adjusting the body-to-wheel distance for each wheel 12 by the actuator force. In the body-posture control, a target body-to-wheel distance (hereinafter simply referred to as "target distance") L* for each wheel 12 is determined based on each of the roll restrain control, the pitch restrain control, and the actuator-dependent height change control, and a posture control component $i_S$ of the target electrifying current is determined for controlling each actuator 26 such that the body-to-wheel distance for each wheel 12 becomes equal to the corresponding target distance. That is, the body-posture control is a control in which the body-to-wheel distance is a direct control subject and which is executed according to the so-called position control technique. In the roll restrain control, the pitch restrain control, and the actuator-dependent height change control, there are respectively determined a roll restrain component $\delta L_R$, a pitch restrain component $\delta L_P$, and a height change component $\delta L_H$, each of which is a component of an adjustment distance from a neutral distance $L_N$ that is a body-to-wheel distance when the actuator 26 is not generating the actuator force. The target distance L* is determined by summing those components as follows:

$$L^* = L_N + \delta L_R + \delta L_P + \delta L_H$$

Subsequently, there is obtained body-to-wheel distance deviation $\Delta L$ (=L*−Lr) which is deviation of an actual body-to-wheel distance Lr detected by the stroke sensor 164 from the target distance L*. The posture control component $i_S$ of the target electrifying current is determined such that the body-to-wheel distance deviation $\Delta L$ becomes equal to zero. The posture control component $i_S$ determined in the ECU 140 according to the following PID control rule based on the body-to-wheel distance deviation $\Delta L$:

$$i_S = K_P \cdot \Delta L + K_D \cdot \Delta L' + K_I Int(\Delta L)$$

In the above formula, the first, second, and third terms respectively represent a proportional-term component (P-term component), a differential-term component (D-term component), and an integral-term component (I-term component), and $K_P$, $K_D$, and $K_I$ respectively represent a proportional gain, a differential gain, and an integral gain. Further, $Int(\Delta L)$ corresponds to an integral value of the body-to-wheel distance deviation $\Delta L$. Hereinafter, the roll restrain control, the pitch restrain control, and the actuator-dependent height change control will be explained focusing on determining methods for respectively determining the roll restrain component $\delta L_R$, the pitch restrain control $\delta L_P$, and the height change component $\delta L_H$, each of which is a component of the adjustment distance from the neutral distance $L_N$.

3-2-1. Roll Restrain Control

Upon turning of the vehicle, the body and the wheels 12 located on the inner side with respect to the turning are moved away from each other while the body and the wheels 12 located on the outer side with respect to the turning are moved toward each other, due to roll moment that arises from the turning. FIG. 6(a) shows a relationship between lateral acceleration Gy indicative of roll moment and change amount $\delta L$ of body-to-wheel distance. The broken line in FIG. 6(a) shows an instance where the actuator 26 does not work. In the roll restrain control, the actuator 26 is controlled, in accordance with the magnitude of the roll moment, to realize the body-to-wheel distance indicated by the solid line in FIG. 6(a), for restraining the relative movement of the body and the wheel away from each other where the wheel is located on the inner side with respect to the turning and for restraining the relative movement of the body and the wheel toward each other where the wheel is located on the outer side with respect to the turning. More specifically explained, control-use lateral acceleration Gy* to be used in the control is determined as lateral acceleration indicative of the roll moment that the vehicle body receives, according to the following formula, on the basis of (1) estimated lateral acceleration Gyc that is estimated based on the operation angle δ of the steering wheel and the vehicle speed v and (2) actual lateral acceleration Gyr that is actually measured by the lateral acceleration sensor 174:

$$Gy^* = K_1 \cdot Gyc + K_2 \cdot Gyr \quad (K_1, K_2: \text{gains})$$

The roll restrain component $\delta L_R$ of the adjustment distance is determined based on the thus determined control-use lateral acceleration Gy*. More specifically explained, the controller 142 stores map data of FIG. 6(a) relating to the roll restrain component $\delta L_R$ and utilizing the control-use lateral acceleration Gy* as a parameter. The roll restrain component $\delta L_R$ is determined by referring to the map data.

3-2-2. Pitch Restrain Control

When the vehicle body nose-dives upon braking, the body and wheels 12 located on the front side of the vehicle are moved toward each other while the body and wheels 12 located on the rear side of the vehicle are moved away from each other, due to pitch moment that causes the nose dive. When the vehicle body squats upon acceleration, the body and wheels 12 located on the front side of the vehicle are moved away from each other while the body and the wheels 12 located on the rear side of the vehicle are moved toward each other, due to pitch moment that causes the squat. FIG. 6(b) shows a relationship between longitudinal acceleration Gx indicative of pitch moment and change amount SL of body-to-wheel distance. The broken line in FIG. 6(b) shows an instance where the actuator 26 does not work. In the pitch restrain control, the actuator 26 is controlled, in accordance with the magnitude of the pitch moment, to realize the body-to-wheel distance indicated by the solid line in FIG. 6(b), for restraining the relative movement of the body and the wheel away from each other and the relative movement of the body and the wheel toward each other, upon the nose dive and the squat. More specifically explained, actual longitudinal acceleration Gx that is actually measured by the longitudinal acceleration sensor 172 is used as longitudinal acceleration indicative of pitch moment that the vehicle body receives. On the basis of the actual longitudinal acceleration Gx, the pitch restrain component $\delta L_P$ of the adjustment distance is determined. More specifically explained, the controller 142 stores map data of FIG. 6(b) relating to the pitch restrain component $\delta L_P$ and utilizing the longitudinal acceleration Gx as a parameter. The pitch restrain component $\delta L_P$ is determined by referring to the map data. The pitch restrain control is executed when the throttle opening detected by the throttle sensor 180 exceeds a prescribed threshold or the master cylinder pressure detected by the brake-pressure sensor 182 exceeds a prescribed threshold.

3-2-3. Actuator-Dependent Height Change Control

In the present suspension system 10, where the vehicle speed v becomes equal to or higher than a threshold speed $v_1$ (e.g., 80 km/h) when the vehicle body is at the N height, the vehicle height is changed to "height upon high-speed running" which is lower than the N height and higher than the predetermined small height (Low height), in view of the running stability of the vehicle. Further, the vehicle height is changed to "height upon ingress/egress" which is lower than the Low height for ease of ingress/egress of the vehicle driver and loading/unloading of cargos. The height change control in those instances is executed by the actuator 26. More specifically explained, the height change component $\delta L_H$ of the adjustment distance for each wheel 12 is determined in accordance with the height upon high-speed running or the height upon ingress/egress each as a target. It is noted, however, that the height change component $\delta L_H$ is arranged to be gradually decreased with a lapse of time to prevent the target distance L* from being abruptly changed. Similarly, the height change component $\delta L_H$ is arranged to be gradually increased when the vehicle height is changed back to the N height from the height upon high-speed running or the height upon ingress/egress.

3-3. Vibration Damping Control

In the vibration damping control, a vibration damping component $i_V$ of the target electrifying current is determined to generate the actuator force having a magnitude corresponding to the speed of the vibration of the vehicle body and the wheel 12 to be damped. More specifically, the vibration damping component $i_V$ is determined according to the following formula on the basis of (1) a displacement speed of the mount portion 24 in the vertical direction calculated based on the vertical acceleration that is detected by the vertical acceleration sensor 176 disposed on the mount portion 24, i.e., so called "sprung speed $V_U$" and (2) a displacement speed of the wheel in the vertical direction calculated based on the vertical acceleration that is detected by the vertical acceleration sensor 178 disposed on the lower arm 22, i.e., so called "unsprung speed $V_L$":

$$i_V = K_V (C_U \cdot V_U - C_L \cdot V_L)$$

In the above formula, $C_U$ is a gain for generating a damping force in accordance with the displacement speed of the mount portion 24 in the vertical direction and $C_L$ is a gain for generating a damping force in accordance with the displacement speed of the wheel 12 in the vertical direction. That is, the gains $C_U$, $C_L$ are damping coefficients with respect to so-called "sprung vibration" and "unsprung vibration", respectively. The vibration damping component $i_V$ may be determined otherwise. For instance, for executing a control to generate a damping force based on a relative displacement speed of the sprung member and the unsprung member (i.e., a sprung-unsprung relative displacement speed), the vibration damping component $i_V$ may be determined, according to the following formula, based on a rotational speed V of the motor 54 that is obtained, as a value indicative of a relative displacement speed of the vehicle body and the wheel 12, from a value detected by the rotational angle sensor 184 disposed on the motor 54:

$$i_V = K_V \cdot C \cdot V \quad (C: \text{damping coefficient})$$

The vibration damping control is executed only in an instance where it is considered that a vibration whose frequency is not lower than a prescribed value (e.g., 1 Hz) is occurring. To be more specific, the determination of the vibration damping component $i_V$ according to the above formula is made when any of the values detected by the respective vertical acceleration sensors 176, 178 becomes equal to or higher than a prescribed value. Where the vibration damping control is not executed, the vibration damping component $i_V$ is determined to be equal to zero.

3-4. Determination of Target Electrifying Current

On the basis of the thus determined posture control component $i_S$ and vibration damping component $i_V$ each as the component of the target electrifying current, a supply current i* as a target (i.e., target electrifying current) is determined according to the following formula:

$$i^* = i_S + i_V$$

Where the vibration damping control is executed, however, the proportional-term component and the differential-term component are made zero in the determination of the posture control component $i_S$. In this instance, the integral-term component, namely, the current component necessary for generating a constant motor force to maintain the present rotational position of the motor 54, is made as the posture control component $i_S$. The target electrifying current i* is determined by adding the thus determined posture control component $i_S$ and vibration damping component $i_V$. Accordingly, interference of the body-posture control with respect to the vibration damping control is mitigated. A command based on the target electrifying current i* determined as described above is sent to the inverter 146, and the inverter 146 drives the motor 54 so as to generate the motor force in accordance with the target electrifying current i* under a suitable duty ratio. By the motor 54 being thus driven, the actuator 26 generates the actuator force in accordance with the target electrifying current i*.

In the present suspension system 10, as a technique to unify the body-posture control and the vibration damping control, the above-described technique of summing the components in the respective controls relating to the electrifying current of the motor 54 is employed. Instead, the following technique may be employed. Initially, there are determined a component of the actuator force to be generated in the vibration damping control and a component of the actuator force to be generated in the body posture control. These components are summed up to determine a target actuator force, and the target electrifying current is determined in accordance with the determined target actuator force. Where this technique is employed, the actuator force component in the body-posture control may be determined according to the PID control rule based on the body-to-wheel distance deviation ΔL, as in the above-described method.

4. Operation-Halting-State Avoiding Control

When the body-posture control is executed, especially when the body-posture control is executed and the vibration damping control is not executed, there is an instance where the operation of the motor 54 is kept halted at a certain rotational position while the motor 54 is generating the motor force, for maintaining the posture of the vehicle body. In such an instance, the electrifying current amount is not balanced among the three coils of the motor 54, so that the heat generation amount in a part of the coils is larger than that in the other coils. That is, the heat generation is excessive locally in the motor 54, resulting in a large load applied to the motor 54. Accordingly, in the present suspension system 10, an operation-halting-state avoiding control is executed to avoid a state in which the operation of the motor 54 is kept halted at a certain rotational position while the motor 54 is generating the motor force. More specifically explained, there is executed a control wherein where the rotational position of the motor 54 corresponding to the target distance L*, i.e., the target rotational position, is equal to a specific rotational position, the target rotational position is shifted to a position different from the specific position. Hereinafter, the control is referred to as "target-position shifting control" where appropriate. Further, there is executed a control wherein where the rotational position of the motor 54 is kept at a certain position for a time period longer than specified irrespective of whether or not the rotational position of the motor 54 is located at the specific position, the rotational position of the motor 54 is changed. Hereinafter, the control is referred to as "operational-position changing control" where appropriate. It is noted that the operation-halting-state avoiding control is arranged to be executed when the temperature of the motor 54 detected by the temperature sensor 186 is relatively high, namely, only when there is a strong possibility that the motor 54 is adversely influenced by the load applied thereto. Hereinafter, the target-position shifting control and the operational-position changing control executed as the operation-halting-state avoiding control are explained in detail.

4-1. Target-Position Shifting Control

Where the motor 54 stops at a position at which the rotational angle is $\theta_1$ as shown in FIG. 5, for instance, the electrifying current amount of the W phase reaches a peak as shown in FIG. 7(a), and the heat generation amount of the phase is considerably large. In the present suspension system 10, a position at which the electrifying current amount of one of the three phases of the motor 54 is maximum is defined as the specific rotational position, and the target-position shifting control is executed when the rotation of the motor 54 is expected to stop at the specific rotational position. To be more specific, the target-position shifting control is executed when the rotation of the motor 54 is expected to stop at the rotational position corresponding to the rotational angle $\theta_1$ and at rotational positions corresponding to the rotational angles that are shifted from the rotational angle $\theta_1$ by an integral multiple of 20° (an integral multiple of 60° in the electric angle). The target distance L* determined in the body-posture control is in a correspondence relationship with the rotational position of the motor 54. The target-position shifting control is executed actually by shifting the target distance L* to another distance. The rotational position of the motor 54 shifted by the above-indicated another distance is a position at which the electrifying current amount is maximum at two of the three phases, namely, a position at which the maximum electrifying current amount among the three phases is minimum in the electric angle of 360°. More specifically, the target distance L* is shifted by δL (=$C_1 \cdot \delta\theta$, wherein $C_1$ represents a proportional constant between the motor rotational angle and the body-to-wheel distance), such that the target rotational position of the motor 54 is shifted by δθ which is equal to 10° and corresponds to the electric angle of 30°. The target distance L* is corrected according to the following formula:

$$L^* = L^* - \delta L$$

At the rotational position shifted as described above, the electrifying current amount of each phase of the motor 54 is indicated in FIG. 7(b). Because the electrifying current amount of one of the three phases whose electrifying current amount is maximum is reduced or suppressed as shown in FIG. 7(b), the heat generation amount in that one phase is also reduced or suppressed. That is, according to the target-position shifting control, it is possible to obviate the imbalance in the heat generation amount that is influential, namely, it is possible to obviate a state in which the heat generation amount is the most imbalanced, thereby reducing a load to be applied to the motor 54. In the actual target-position shifting control, the determination whether or not the rotational position of the motor 54 is located at the specific rotational position is judged depending upon whether the rotational position of the motor 54 falls in a range within ±2° of the rotational angle (corresponding to 6° of the electric angle) from the specific rotational position.

In the present suspension system 10, when the target-position shifting control is executed for two or more of the four actuators 26, the target distances corresponding to the respective two or more of the actuators 26 are shifted by mutually the same amount δL in the same direction. Accordingly, the body-to-wheel distances for the respective two or more of the actuators 26 are changed by mutually the same amount in the same direction. In the present system 10, therefore, when the target-position shifting control is executed, the changes of the body-to-wheel distances respectively corresponding to the actuators for which the target-position shifting control is executed are synchronized. Further, in the system 10, when the target-position shifting control is executed for at least one of the four actuators 26, there is executed, for the other actuators 26, a control for shifting the target distances L* of each of the other actuators 26 by the amount δL. Accordingly, when the target-position shifting control is executed for the at least one of the four actuators 26, the vehicle body is shifted by the amount δL in the vertical direction. That is, in the present system 10, there is executed, for the above-indicated other actuators 26, a change-following control for changing the body-to-wheel distance corresponding to each of the other actuators 26 in accordance with a change of the body-to-wheel distance generated due to execution of the operation-halting-state avoiding control. In the present system 10, even when the target-position shifting control is executed for at least one actuator 26 that is a part of the four actuators 26, it is possible to prevent the vehicle body from being inclined due to the execution of the target-position shifting control, owing to the above-described synchronization of the changes executed for the two or more of the actuators 26 and the above-described change-following control.

4-2. Operational-Position Changing Control

In the state in which the operation of the motor 54 is kept halted while the motor 54 is generating the motor force, the heat generation in the motor 54 is imbalanced irrespective of whether the rotational position of the motor 54 is located at the above-indicated specific rotational position. The longer the situation continues, the more adversely the motor 54 is influenced by the imbalance in the heat generation. Where the motor 54 is kept halted at a position corresponding to a rotational angle $\theta_2$ shown in FIG. 5, for instance, the electrifying current amount of the U phase is maximum among the three phases and the heat generation amount is large at the U phase. In the present suspension system 10, the rotational position of the motor 54 is changed where the rotational position of the motor 54 remains the same for a time period longer then specified (e.g., longer than three seconds). More specifically explained, the rotational position of the motor 54 is periodically changed in a range within ±60° (corresponding to ±180° of the electric angle) from the position at which the motor 54 is kept halted, at a frequency f between the sprung resonance frequency and the unsprung resonance frequency, namely, at a frequency f that falls in a range within ±4 Hz with respect to an average value of those resonance frequencies, e.g., at a frequency f of 5 Hz. Actually, the target distance L* determined in the body-posture control is corrected with respect to a time t according to the following formula:

$$L^* = L^* + C_2 \cdot \sin(360° \cdot f \cdot t)$$

In the above formula, $C_2$ represents an amplitude for changing the body-to-wheel distance and corresponds to a difference between the body-to-wheel distance before shifting and the body-to-wheel distance after the motor rotational angle has been shifted by 60° (corresponding to 180° of the electric angle). According to the control described above, the electrifying current amounts of the respective three phases are constantly changed, so that the heat generation amounts in the three phases are equal to each other. In other words, it is possible to prevent the imbalance in the heat generation among the three phases of the motor 54, thereby reducing the load to be applied to the motor 54.

Also where the operational-position changing control is executed, the present system 10 executes the change-following control for the actuator(s) 26 for which the operational-position changing control is not being executed, as in an instance where the above-described target-position shifting control is executed. That is, where the operational-position changing control is executed for at least one of the four actuators 26, the body-to-wheel distances for the respective four wheels 12 are changed for preventing inclination of the vehicle body arising from the execution of the control.

5. Control Programs

Figure 8:
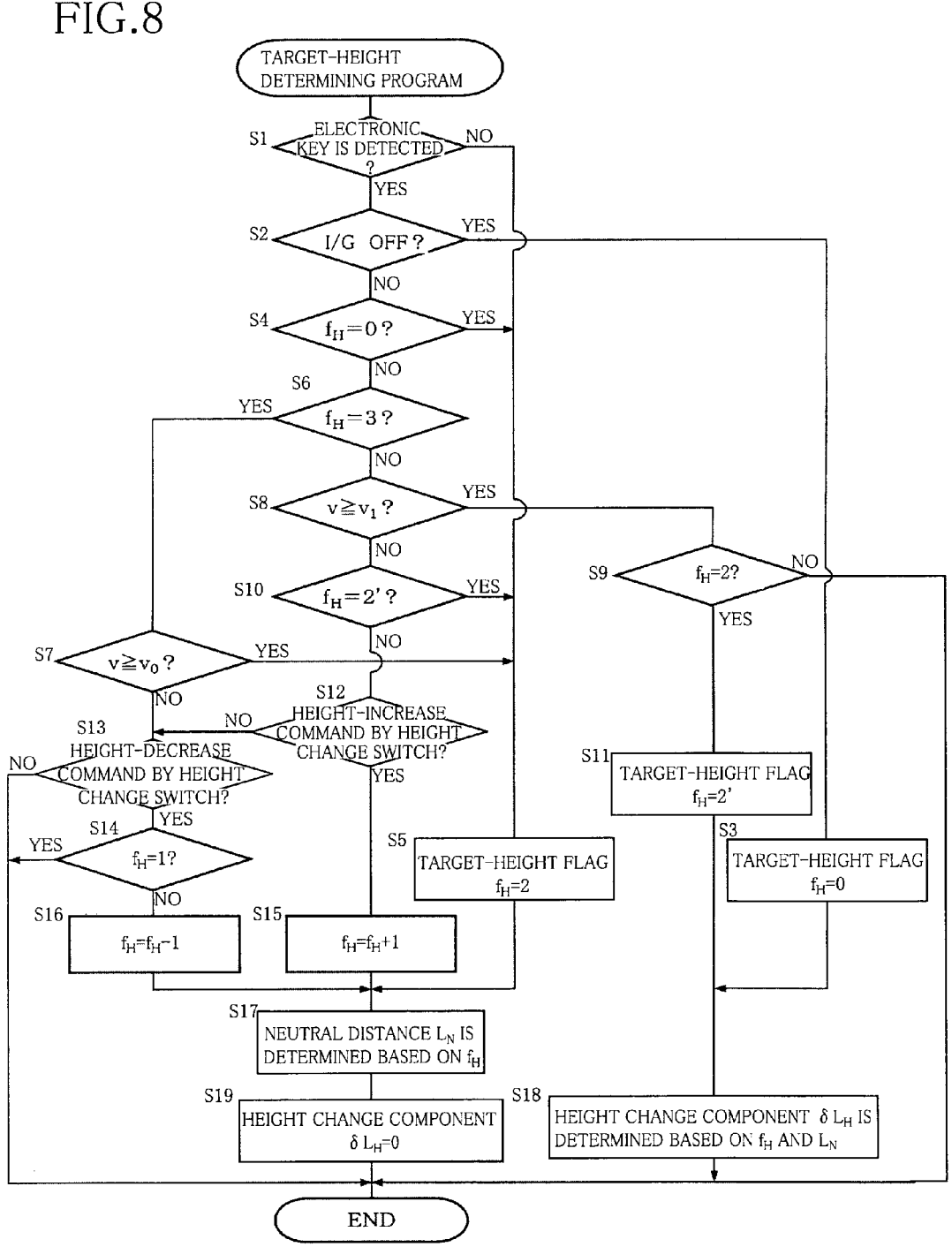
FIG. 8 is a flow chart showing a target-height determining program executed by a suspension electronic control unit shown in FIG. 1.
Figure 9:
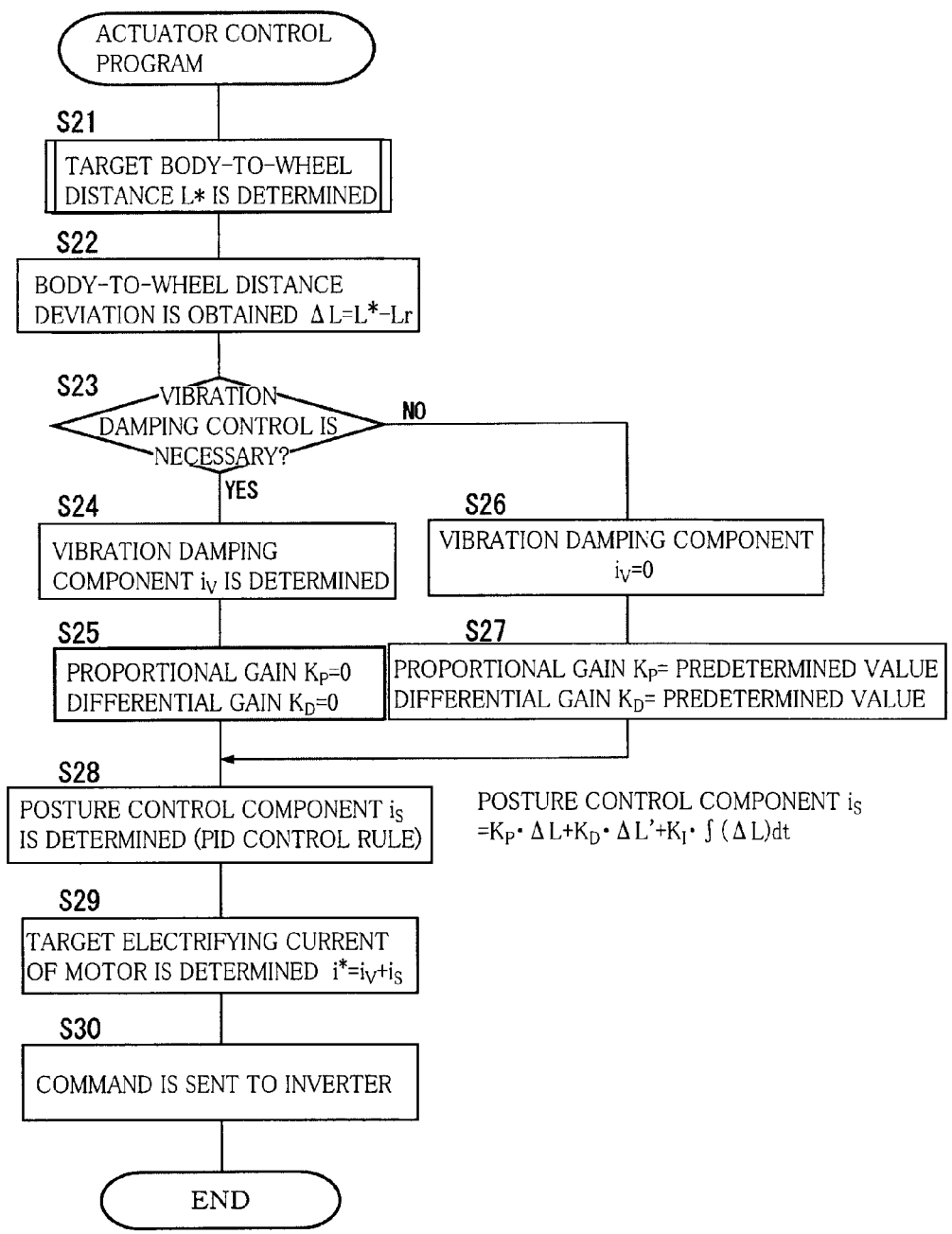
FIG. 9 is a flow chart showing an actuator control program executed by the suspension electronic control unit shown in FIG. 1.
Figure 11:
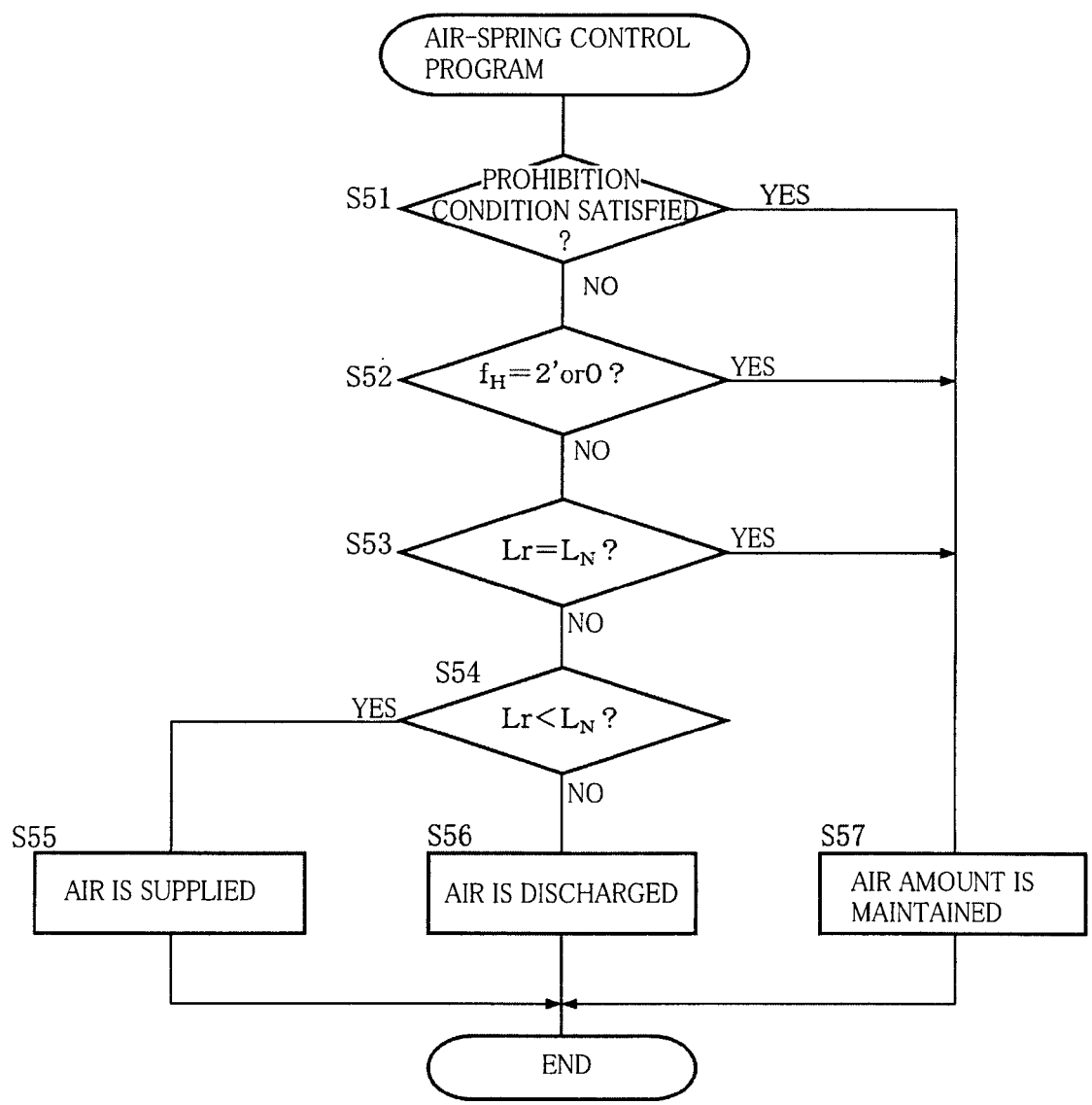
FIG. 11 is a flow chart showing an air-spring control program executed by the suspension electronic control unit shown in FIG. 1.

The control of the actuator 26 and the control of the air spring 28 are executed such that an actuator control program indicated by a flow chart of FIG. 9 and an air-spring control program indicated by a flow chart of FIG. 11 are respectively implemented by the controller 142 repeatedly at considerably short time intervals δt, e.g., from several milliseconds to several tens of milliseconds. The vehicle on which the present suspension system 10 is installed employs an electronic key, and a sensor (not shown) provided on the vehicle is configured to detect the electronic key when the key is present within a prescribed area distant from the vehicle. The above-indicated two programs are executed for a time period from a time point when the electronic key is detected to a time point when a prescribed time (e.g., 60 seconds) is elapsed after the key has not been detected. In the processing according to each of the two programs, the processing of changing the vehicle height is executed based on the target height. The determination of the target height, namely, the determination of the target body-to-wheel distance and the determination of the height change component of the adjustment distance of the body-to-wheel distance, are implemented by execution of a target-height determining program indicated by a flow chart of FIG. 8. The target-height determining program is executed in parallel with the above-indicated two control programs for the same time period as the two programs are executed. There will be briefly explained hereinafter a control flow of each program with reference to the corresponding flow chart.

5-1. Target-Height Determining Program

In the target-height determining program, a target-height flag $f_H$ indicative of the target height is utilized, and the target height is determined based on the flag $f_H$. In the present suspension system 10, the following three predetermined heights are prepared: "normal height (N height)" as a basic height; "Low height" smaller than the N height; and "Hi height" larger than the N height. The flag values [1], [2], [3] of the target-height flag $f_H$ respectively correspond to the Low height, the N height, and the Hi height. Basically, the flag value of the target-height flag $f_H$ is changed on either of the larger height side or the smaller height side, depending upon whether the command based on the operation of the vehicle-height change switch 166 is the height-increase command or the height-decrease command.

In the present suspension system 10, the vehicle height is changed in response to the vehicle speed. Where the vehicle speed v becomes equal to or higher than a threshold speed $v_0$ (e.g., 50 km/h) when the vehicle body is at the Hi height ($f_H=3$), the flag value is changed to [2] for changing the vehicle height from the Hi height to the N height in view of the vehicle running stability. Where the vehicle speed v becomes equal to or higher than a threshold speed $v_1$ (e.g., 80 km/h) when the vehicle body is at the N height ($f_H=2$), the flag value is changed to [2'] corresponding to "height upon high-speed running" that is smaller than the N height by δ1 and that is larger than the Low height, in view of further running stability. Where the vehicle speed becomes lower than the threshold speed $v_1$ after once having become equal to or higher than the threshold speed $v_1$, the vehicle height is changed back to the N height.

Further, in the present suspension system 10, changing of the vehicle height upon ingress/egress is executed as a control for facilitating ingress/egress of the vehicle driver and loading/unloading of cargos. There is prepared, as a vehicle height upon ingress/egress, "height upon ingress/egress" that is further smaller than the Low height. In the changing of the vehicle height upon ingress/egress, the flag value of the target-height flag $f_H$ is set at [0] corresponding to the height upon ingress/egress when the ignition switch 160 is turned off, and the flag value of the target-height flag $f_H$ is set at [2'] when the driver carrying the electronic key is moved outside the detectable range of the sensor. On the contrary, the flag value of the target-height flag $f_H$ is set at [0] when the driver carrying the electronic key is moved into the detectable range, and the flag value of the target-height flag $f_H$ is set at [2'] when the ignition switch 160 is turned on.

In step S17 (hereinafter "step" is omitted where appropriate) of the target-height determining program shown in FIG. 8, the neutral distance $L_N$ that is the body-to-wheel distance in a state in which the actuator 26 is not generating the actuator force, namely, the body-to-wheel distance as a target in the height change control by the air spring 28, is determined to be equal to L1, L2, or L3 corresponding to the flag value of the target-height flag $f_H$ [1], [2], or [3]. Further, in S18, the height change component $\delta L_H$ to be utilized in the height change control by the actuator 26 is determined to be equal to $L_0-L_N$ or $L_2-L_N$ corresponding to the flag value of the target-height flag $f_H$ [0] or [2']. It is noted, however, that the height change component $\delta L_H$ is gradually changed for preventing the target distance L* from being abruptly changed. Where the flag value of the target-height flag $f_H$ is [1], [2], or [3], the height change component $\delta L_H$ is determined to be equal to zero in S19.

5-2. Actuator Control Program

Figure 10:
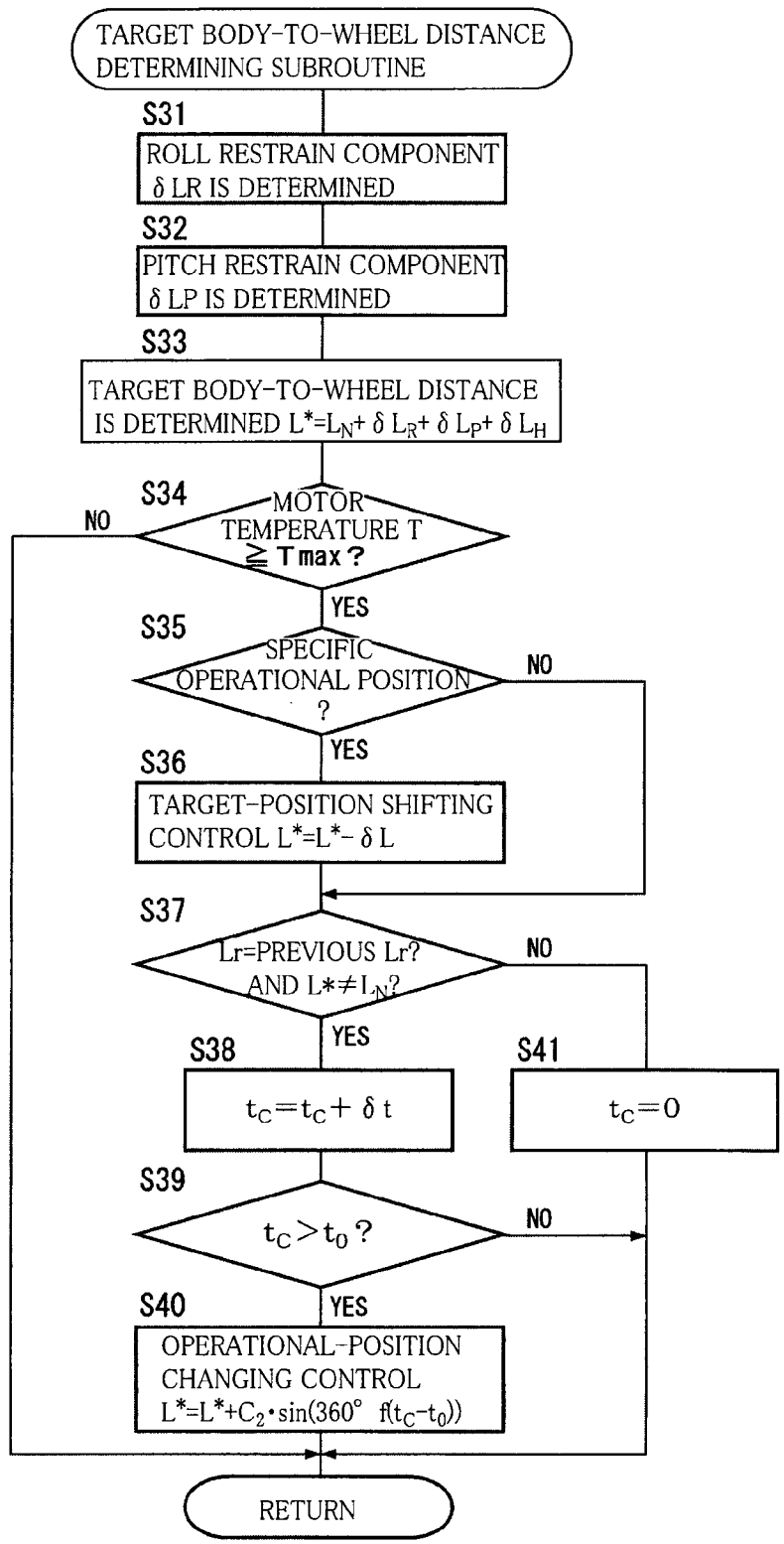
FIG. 10 is a flow chart showing a target body-to-wheel distance determining subroutine executed in the actuator control program.

The actuator control program is executed for the actuator 26 of each of the spring•absorber Assys 20 disposed for the respective four wheels 12. In the following description, the processing by the present program for one actuator 26 is explained in the interest of brevity. In the processing by the present program, the vibration damping component $i_V$ and the posture control component $i_S$ each as the component of the target electrifying current are determined. In the present program, a target body-to-wheel distance determining subroutine indicated by a flow chart of FIG. 10 is implemented in S21 so as to determine the target body-to-wheel distance L*.

In the target body-to-wheel distance determining subroutine, the roll restrain component $\delta L_R$ and the pitch restrain component $\delta L_P$ each of which is the component of the adjustment distance from the neutral distance $L_N$ are initially determined as described above respectively in S31 and S32. Next, in S33, the target distance L* (=$L_N+\delta L_R+\delta L_P+\delta L_H$) is determined on the basis of the determined roll restrain component $\delta L_R$ and pitch restrain component $\delta L_P$ and the height change component $\delta L_H$ determined tin the target-height determining program. In S34 and the following steps, it is judged whether the operation-halting-state avoiding control needs to be executed. Where it is judged that the operation-halting-state avoiding control needs to be executed, the target distance L* is corrected in the operation-halting-state avoiding control.

More specifically explained, it is judged in S34 whether the temperature of the motor 54 is not lower than a predetermined temperature Tmax. Where the temperature of the motor 54 is judged to be lower than the predetermined temperature Tmax, S35 and the following steps are skipped since the operation-halting-state avoiding control need not be executed. Where the temperature of the motor 54 is judged to be not lower than the predetermined temperature Tmax, on the other hand, it is judged in S35 whether the rotational position of the motor 54 corresponding to the target distance is located at the specific operational position explained above. Where the rotational position of the motor 54 is located at the specific operational position, the target-position shifting control is executed in S36 to correct the target distance L*. Subsequently, it is judged in S37 whether the operation of the motor 54 is kept halted while the motor 54 is generating the motor force. That is, it is judged that the operation of the motor 54 is kept halted while the motor 54 is generating the motor force if the target distance L* determined in S33 is not equal to the neutral distance $L_N$ and the actual body-to-wheel distance Lr detected by the stroke sensor 164 is the same as in previous execution of the program. Where it is judged that the operation of the motor 54 is kept halted while the motor 54 is generating the motor force, S38 is implemented to count a halting time $t_C$ by adding the pitch time $\delta t$ of the execution of the program. When the halting time $t_C$ exceeds the predetermined time $t_0$, S40 is implemented to execute the operational-position changing control, so that the target distance L* is corrected so as to be periodically changed within the above-indicated range.

After the target distance L* is determined as described above, S22 in the main program is implemented to obtain the body-to-wheel distance deviation $\Delta L$ (=L*-Lr) that is deviation of the actual body-to-wheel distance Lr from the determined target distance L*. Subsequently, the posture control component $i_S$ of the target electrifying current is determined such that the body-to-wheel distance deviation $\Delta L$ becomes equal to zero. Where it is judged, however, in S23 that the vibration damping control is necessary, the vibration damping component $i_V$ is determined and the proportional gain $K_P$ and the differential gain $K_D$ are both made equal to zero. Where the vibration damping control is not necessary, the vibration damping component $i_V$ is determined to be equal to zero and the proportional gain $K_P$ and the differential gain $K_D$ are made equal to the respective predetermined values. Subsequently, the target electrifying current i* is determined by adding the vibration damping component $i_V$ and posture control component $i_S$. The control signal corresponding to the determined target electrifying current i* is sent to the motor 54 via the corresponding inverter 146. Thus, one execution of the actuator control program is ended.

5-3. Air-Spring Control Program

The air-spring control program is executed individually for the respective wheels 12. In the air-spring control program, it is judged in S51 whether the height-change prohibition condition explained above is satisfied or not, and it is judged in S52 whether or not the target-height flag $f_H$ is [0] or [2']. Where it is judged that the height-change prohibition condition is not satisfied and it is judged that the target-height flag $f_H$ is neither [0] nor [2'], the actual body-to-wheel distance Lr for each wheel at the present time point and the neutral distance $L_N$ that is the target body-to-wheel distance corresponding to the flag value of the target-height flag $f_H$ are compared with each other in S53 and S54. Where it is judged that the body-to-wheel distance needs to be increased, S55 is implemented to supply the air to the pressure chamber 46 of the air spring 28. On the other hand, where it is judged that the body-to-wheel distance needs to be decreased, S56 is implemented to discharge the air from the pressure chamber 46 of the air spring 28. Further, where the height-change prohibition condition is satisfied, where the target-height flag $f_H$ is [0] or [2'], and where it is judged that the body-to-wheel distance need not be changed, S57 is implemented to maintain the air amount as explained above. After a series of processing described above, one execution of the present program is ended.

6. Functional Structure of Control Device

Figure 12:
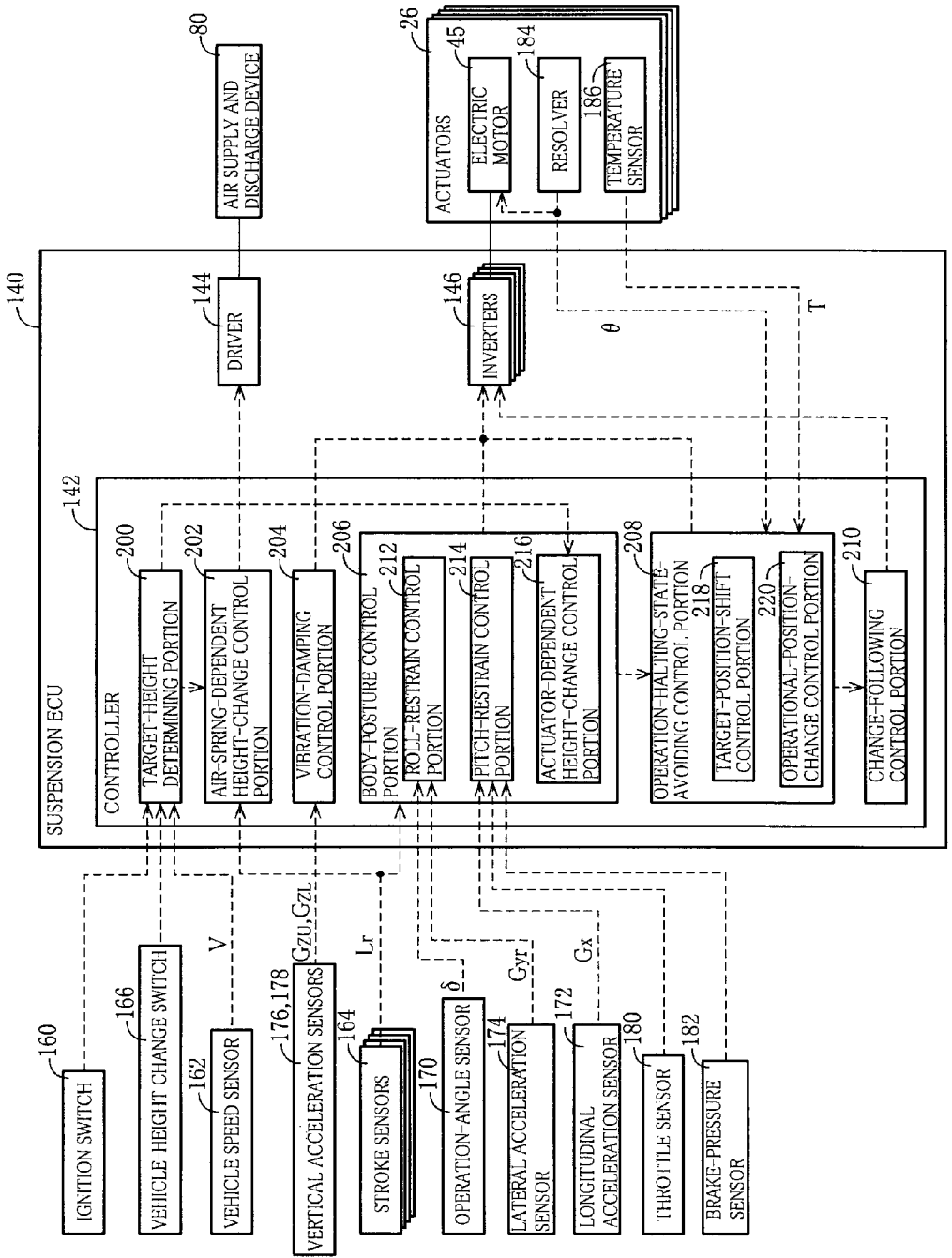
FIG. 12 is a functional block diagram of the suspension electronic control unit shown in FIG. 1.

FIG. 12 is a functional block diagram schematically showing the function of the above-described ECU 140. According to the function described above, the controller 142 of the ECU 140 includes: a target-height determining portion 200 for determining the target height: an air-spring-dependent height-change control portion 202 for performing the height change depending on the air spring 28; a vibration-damping control portion 204 for determining the vibration damping component $i_V$ of the target electrifying current to the actuator 26; a body-posture control portion 206 for determining the body-posture control component $i_S$ of the target electrifying current to the actuator 26; an operation-halting-state-avoiding control portion 208 for executing the operation-halting-state avoiding control: and a change-following control portion 210 for executing the change following control. The body-posture control portion 206 includes: a roll-restrain control portion 212 for determining the roll restrain component $\delta L_R$ of the adjustment distance of the body-to-wheel distance with respect to the neutral distance; a pitch-restrain control portion 214 for determining the pitch restrain component $\delta L_P$ of the adjustment distance; and an actuator-dependent height-change control portion 216 for determining the height change component $\delta L_H$ of the adjustment distance. The operation-halting-state-avoiding control portion 208 includes: a target-position-shift control portion 218 for executing the target-position shifting control; and an operational-position-change control portion 220 for executing the operational-position changing control. In the ECU 140 of the present suspension system 10, the operation-halting-state-avoiding control portion 208 is constituted by including a portion that executes the processing in S34-S40 of the target body-to-wheel distance determining subroutine. The target-position-shift control portion 218 is constituted by including a portion that executes the processing in S35 and S36. The operational-position-change control portion 220 is constituted by including a portion that executes the processing in S37-S40.

(B) Second Embodiment

A suspension system for a vehicle according to a second embodiment is identical in hardware structure with the system in the illustrated first embodiment. In the following explanation, therefore, the same reference numerals as used in the first embodiment are used to identify the corresponding components having the same function as in the first embodiment, and a detailed explanation of which is dispensed with. The system of the second embodiment differs from the system of the first embodiment in the control by the ECU. Accordingly, the control by the ECU according to the present embodiment will be hereinafter explained.

1. Control of Actuator

The present embodiment differs from the illustrated first embodiment in a control of the actuator 26 by the suspension ECU 140. In the present suspension system 10, the actuator forces of the actuators 26 in the respective spring•absorber Assys 20 are controlled independently of each other for executing the vibration damping control and the body-posture control in which are integrated the roll restrain control, the pitch restrain control, and the actuator-dependent height change control. In these controls, the actuator force acts as a damping force, a roll restrain force, a pitch restrain force, and a height change force, respectively. More specifically explained, a target actuator force is determined by summing a damping-force component, a roll-restrain-force component, a pitch-restrain-force component, and a height-change-force component each as a component of the actuator force in each control, and the actuator 26 is controlled to generate the target actuator force, whereby these controls are executed in a unified manner. That is, the body-posture control in the present embodiment is a control in which the actuator force is a direct control subject and which is executed according to a force control technique. Hereinafter, each of the vibration damping control, the roll restrain control, the pitch restrain control, and the actuator-dependent height change control is explained focusing on a method of determining the actuator force component in each control.

1-1. Vibration Damping Control

In the vibration damping control, a vibration-damping-force component $F_V$ is determined to generate an actuator force having a magnitude in accordance with a speed of a vibration of the vehicle body and the wheel 12 to be damped. To be more specific, the damping-force component $F_V$ is determined according to the following formula on the basis of a sprung speed $V_U$ detected and calculated by the vertical acceleration sensor 176 disposed on the mount portion 24 of the vehicle body and an unsprung speed $V_L$ detected and calculated by the vertical acceleration sensor 178 disposed on the lower arm 22:

$$F_V = K_V(C_U \cdot V_U - C_L \cdot V_L)(K_V:\text{gain})$$

1-2. Roll Restrain Control

In the roll restrain control, upon turning of the vehicle, the actuators 26 located on the inner side with respect to the turning are controlled to generate an actuator force in the bound direction while the actuators 26 located on the outer side with respect to the turning are controlled to generate an actuator force in the rebound direction, in accordance with roll moment arising from the turning. The actuator force is generated as a roll restrain force. More specifically, a roll-restrain-force component $F_R$ is determined according to the following formula based on the control-use lateral acceleration Gy* determined in a manner similar to that in the illustrated embodiment:

$$F_R = K_R \cdot Gy^* (K_R:\text{gain})$$

1-3. Pitch Restrain Control

In the pitch restrain control, when the vehicle body nose-dives upon braking, the actuators 26FL, FR located on the front side of the vehicle are controlled to generate an actuator force in the rebound direction while the actuators 26RL, RR located on the rear side of the vehicle are controlled to generate an actuator force in the bound direction, in accordance with pitch moment arising from the nose dive. The actuator force is generated as a pitch restrain force. When the vehicle body squats upon acceleration, the actuators 26RL, RR located on the rear side of the vehicle are controlled to generate an actuator force in the rebound direction while the actuators 26FL, FR located on the front side of the vehicle are controlled to generate an actuator force in the bound direction, in accordance with pitch moment arising from the squat. The actuator force is generated as a pitch restrain force. More specifically, a pitch-restrain-force component $F_P$ is determined according to the following formula based on the actual longitudinal acceleration Gx actually measured by the longitudinal acceleration sensor 172:

$$F_P = K_P \cdot Gx (K_P:\text{gain})$$

1-4. Actuator-Dependent Height Change Control

As in the illustrated first embodiment, the height change control by the actuator 26 is executed in an instance where the vehicle height is changed to the "height upon high-speed running" when the vehicle speed v becomes equal to or higher than the threshold speed $v_1$ (e.g., 80 km/h) at the N height and in an instance where the vehicle height is changed to the "height upon ingress/egress". To be more specific, a height change distance $\delta L_H$ is determined for each wheel 12 in accordance with the height upon high-speed running or the height upon ingress/egress each as a target, and a height-change-force component $F_H$ is determined according to the following formula based on the height change distance $\delta L_H$:

$$F_H = K_H \cdot \delta L_H \quad (K_H: \text{gain})$$

1-5. Actuator Force and Control of Operation of Motor

The control of the actuator 26 is executed based on a target actuator force as an actuator force to be generated. To be more specific, the target actuator force F is determined according to the following formula based on the vibration-damping-force component $F_V$, the roll-restrain-force component $F_R$, the pitch-restrain-force component $F_P$, and the height-change-force component $F_H$ determined as described above:

$$F = F_V + F_R + F_P + F_H$$

Subsequently, the target electrifying current i* to the motor 54 is determined according to the following formula based on the determined target actuator force F:

$$i^* = K \cdot F$$

The actuator force is generated in accordance with the determined target electrifying current i*. As in the illustrated first embodiment, a command as to the duty ratio based on the target electrifying current i* is sent to the inverter 146, and the switching elements of the inverter 146 are changed according to the command, whereby the operation of the motor 54 is controlled.

2. Operation-Halting-State Avoiding Control

In the present embodiment, there is executed, as the operation-halting-state avoiding control, the operational-position changing control for changing the rotational position of the motor 54 where the rotational position of the motor 54 is kept halted at the certain position for a time period longer than specified. Since the body-posture control is executed according to the so-called force control technique, the target-position shifting control is not executed in the present embodiment. As in the illustrated first embodiment, in the present operational-position changing control, the rotational position of the motor 54 is changed where the rotational position of the motor 54 is kept halted at the certain position for a time period of not less than the predetermined time $t_0$ (e.g., three seconds). More specifically, the rotational position of the motor 54 is periodically changed in a range within ±60° (corresponding to ±180° of the electric angle) from the certain position at which the motor 54 is kept halted. In the present embodiment, however, the rotational position of the motor 54 is changed at a frequency f lower than the sprung resonance frequency, in more detail, at a frequency f lower than half the sprung resonance frequency (e.g., 0.2 Hz). To be more specific, the target electrifying current i* determined as described above is corrected with respect to the time t according to the following formula:

$$i^{*\prime} = i^* + C \cdot \sin(360° \cdot f \cdot t)$$

In the above formula, C is a constant that represents an amplitude of a change in the target electrifying current and is determined with respect to a difference between the body-to-wheel distance before shifting and the body-to-wheel distance after the motor rotational angle has been shifted by 60° (corresponding to 180° of the electric angle).

Where the operational-position changing control is executed with the air amount in the pressure chamber 46 of the air spring 28 maintained, for instance, the body-to-wheel distance is changed in accordance with the change of the rotational position of the motor 54. In the present embodiment, there is executed a control for maintaining the body-to-wheel distance at a constant value by adjusting, in the operational-position changing control, the air amount in the pressure chamber 46 of the air spring 28 in accordance with the change of the rotational position of the motor 54. To be more specific, the body-to-wheel distance where the rotation of the motor 54 is kept halted is made as a control target of the air spring 28, and the operation of the air supply and discharge device 80 is controlled so as to maintain the body-to-wheel distance even when the rotational position of the motor 54 is changed. The length of the actuator 26 is changed by execution of the operational-position changing control. However, the change of the length of the actuator 26 can be absorbed by the coil spring 42 disposed in series with the actuator 26. Accordingly, the overall length of the spring•absorber Assy 20 can be kept constant even when the actuator force and the vehicle body holding force of the air spring are changed. In the present embodiment, the speed of change of the target electrifying current i* in the operational-position changing control, namely, the speed of change of the actuator force, is made relatively low as described above. Accordingly, it is possible to sufficiently prevent the body-to-wheel distance from being changed owing to the adjustment of the air amount in the air spring 28.

3. Control Programs

Figure 13:
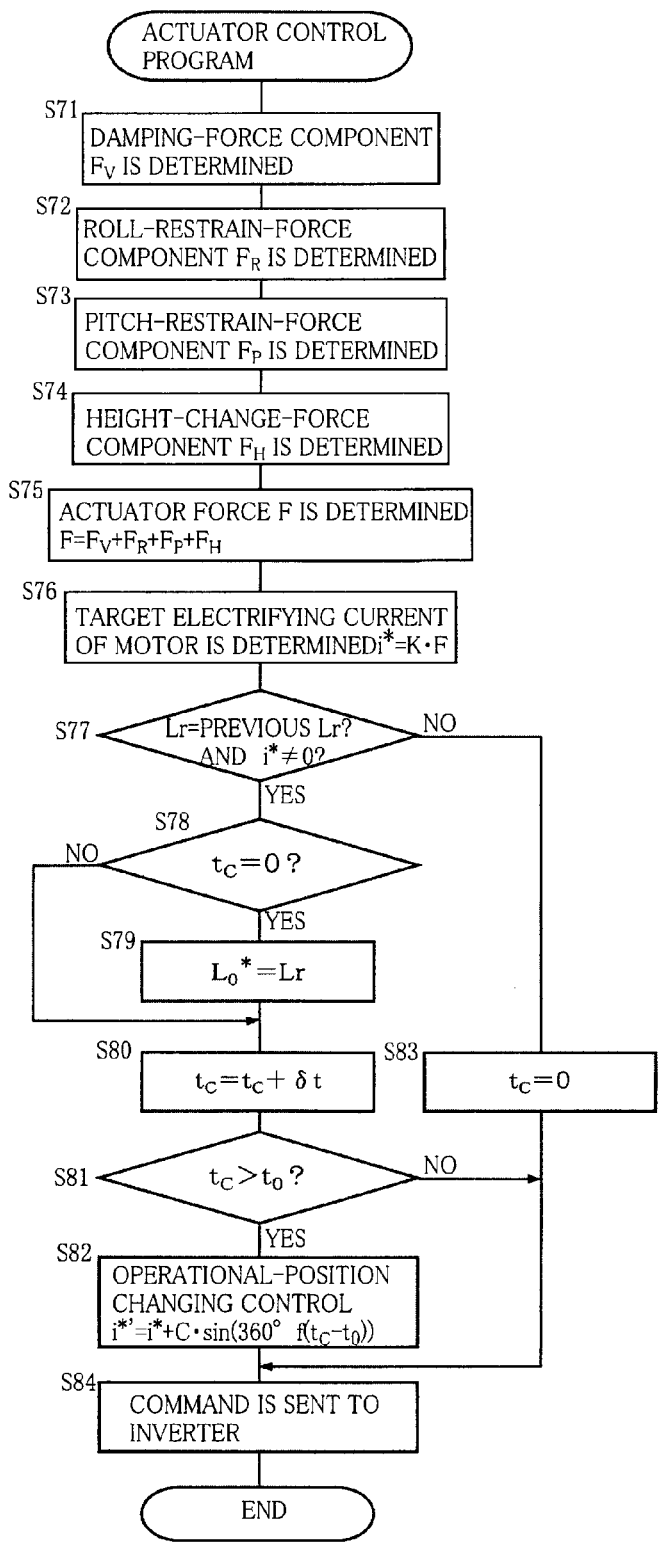
FIG. 13 is a flow chart showing an actuator control program executed in a suspension system according to a second embodiment.

The control of the actuator 26 and the control of the air spring 28 in the present embodiment are executed such that an actuator control program indicated by a flow chart of FIG. 13 and an air-spring control program indicated by a flow chart of FIG. 14 are respectively executed. In the actuator control program, the target electrifying current i* of the motor 54 is determined as described above in S71-S76. Subsequently, it is judged in S77 whether the operation of the motor 54 is kept halted while the motor 54 is generating the motor force. That is, it is judged that the operation of the motor 54 is kept halted while the motor 54 is generating the motor force if the determined target electrifying current i* is not equal to zero and the actual body-to-wheel distance Lr detected by the stroke sensor 164 is the same as in previous execution of the program. Where it is judged that the operation of the motor 54 is kept halted while the motor 54 is generating the motor force, S80 is implemented to count the halting time $t_C$ by adding the pitch time $\delta t$ of the execution of the program. When the halting time $t_C$ exceeds the predetermined time $t_0$, S82 is implemented to execute the operational-position changing control, so that the target electrifying current i* is corrected so as to be periodically changed. Where it is judged that the operation of the motor 54 is kept halted, the actual body-to-wheel distance Lr at that time point is made in S79 as a control target distance $L_0$* of the air spring 28 in the operational-position changing control.

In the air-spring control program, there is executed a control for maintaining the body-to-wheel distance at a constant value in the operational-position changing control as explained above, in addition to the air-spring-dependent height change control which is similar to that in the illustrated first embodiment. More specifically explained, it is judged in S91 whether the halting time $t_C$ during which the rotational position of the motor 54 is kept halted exceeds the predetermined time $t_0$. When the halting time $t_C$ exceeds the predetermined time $t_0$, the actual body-to-wheel distance Lr for each wheel at the present time point and the control target distance $L_0^*$ determined in the actuator control program are compared with each other in S98 and S99, so that the air supply and air discharge to and form the air spring 28 is controlled. Thus, the actual body-to-wheel distance Lr is maintained at the control target distance $L_0^*$.

As in the suspension system according to the illustrated first embodiment, in the suspension system according to the exemplary second embodiment, the operational-position changing control is executed, so that the electrifying amounts of the respective three phases are constantly changed. As a result, the heat generation amounts in the respective three phases are made equal to each other. In other words, the imbalance in the heat generation in the motor 54 is prevented, whereby the load to be applied to the motor 54 can be reduced.

The invention claimed is:

1. A suspension system for a vehicle, comprising:
an electromagnetic actuator which includes an electric motor and which generates, based on a motor force generated by the electric motor, an actuator force that is a force in a direction in which a body of the vehicle and a wheel are vertically moved toward and away from each other; and
a control device which controls an operation of the electromagnetic actuator by controlling the electric motor,
wherein the control device is configured to execute an operation-halting-state avoiding control for avoiding a state in which an operation of the electric motor is kept halted at a certain operational position while the motor is generating the motor force,
wherein the control device is configured to execute, as the operation-halting-state avoiding control, an operational-position changing control in which an operational position of the electric motor is periodically changed at a frequency between a sprung resonance frequency and an unsprung resonance frequency.

2. The suspension system according to claim 1, wherein the electromagnetic actuator is configured to change a distance between the body of the vehicle and the wheel in a vertical direction, in accordance with the operational position of the electric motor.

3. The suspension system according to claim 1, wherein the operational position of the electric motor is determined by a relative position of a stationary element and a rotary element thereof.

4. The suspension system according to claim 1, wherein the control device is configured to execute the operation-halting-state avoiding control where the operation of the electric motor is kept halted at the certain operational position for a time period longer than specified.

5. The suspension system according to claim 1, wherein the control device is configured to execute the operation-halting-state avoiding control where the operation of the electric motor is kept halted at a specific operational position.

6. The suspension system according to claim 5, wherein the specific operational position is defined as a position at which an electrifying current amount of one of a plurality of phases of the electric motor is maximum.

7. The suspension system according to claim 1, wherein the operational-position changing control is a control in which the operational position of the electric motor is changed over an electrical angle range of 360°.

8. The suspension system according to claim 1,
wherein the electromagnetic actuator is configured to change a distance between the body of the vehicle and the wheel in a vertical direction, in accordance with the operational position of the electric motor,
wherein the suspension system further comprises: (a) a hydrodynamic suspension spring elastically supporting the body of the vehicle and the wheel relative to each other and configured to change a spring length by a fluid inflow thereinto and a fluid outflow therefrom; and (b) an actuator-supporting spring disposed between the electromagnetic actuator and one of the body of the vehicle and the wheel and elastically supporting the electromagnetic actuator and the one of the body of the vehicle and the wheel relative to each other, and
wherein the control device is configured to further execute, in the operation-halting-state avoiding control, a control to permit the fluid inflow and the fluid outflow into and from the hydrodynamic suspension spring to eliminate a change of the distance between the body of the vehicle and the wheel generated due to execution of the operation-halting-state avoiding control.

9. The suspension system according to claim 1, further comprising a temperature detector for detecting a temperature of the electric motor,
wherein the control device is configured to execute the operation-halting-state avoiding control when the temperature of the electric motor detected by the temperature detector becomes higher than a predetermined threshold.

10. The suspension system according to claim 1, comprising a plurality of electromagnetic actuators each as the electromagnetic actuator, the plurality of electromagnetic actuators corresponding to a plurality of wheels,
wherein the control device is configured to execute the operation-halting-state avoiding control for each of the plurality of electromagnetic actuators.

11. The suspension system according to claim 10,
wherein each of the plurality of electromagnetic actuators is configured to change a distance between the body of the vehicle and the wheel in a vertical direction, in accordance with the operational position of the corresponding electric motor, and
wherein when the control device executes the operation-halting state avoiding control for each of two or more of the plurality of electromagnetic actuators, the control device synchronizes changes of the distances respectively corresponding to the two or more of the plurality of electromagnetic actuators to each other, the changes of the distances being generated due to execution of the operation-halting-state avoiding control.

12. The suspension system according to claim 11,
wherein when the control device executes the operational-position changing control for the two or more of the plurality of electromagnetic actuators, the control device changes the operational position of the electric motor of each of the two or more of the plurality of actuators so as not to cause a deviation in the changes of the distances respectively corresponding to the two or more of the plurality of actuators.

13. The suspension system according to claim 1, wherein the control device is configured to execute a control in which the actuator force generated by the electromagnetic actuator acts as a damping force with respect to a motion of the body of the vehicle and the wheel toward and away from each other.

14. The suspension system according to claim 1,
wherein the electromagnetic actuator includes: an external thread portion configured to be immovable relative to one of a sprung member and an unsprung member; and an internal thread portion configured to be immovable relative to the other of the sprung portion and the unsprung portion, to engage the external thread portion, and to rotate relative to the external thread portion in association with a motion of the body of the vehicle and the wheel toward and away from each other, and wherein the electromagnetic actuator is configured to generate the actuator force by giving a relative rotational force to the external thread portion and the internal thread portion by the electric motor.

15. The suspension system according to claim 1, wherein the electric motor is a three-phase brushless DC motor.

16. The suspension system according to claim 15, wherein the control device includes a drive circuit configured to drive the electric motor in a sine-wave drive mode.

17. The suspension system according to claim 1, wherein the operational-position changing control is a control in which the operational position of the electric motor is changed at a frequency which is an average of the sprung resonance frequency and the unsprung resonance frequency.

* * * * *